(12) United States Patent
Pincenti et al.

(10) Patent No.: US 10,574,876 B2
(45) Date of Patent: Feb. 25, 2020

(54) PHOTOGRAPHY ENVIRONMENT CONTROL

(71) Applicant: Motorola Mobility LLC, Chicago, IL (US)

(72) Inventors: John Christopher Pincenti, Chicago, IL (US); Alberto R. Cavallaro, Northbrook, IL (US); Robert S. Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/786,365

(22) Filed: Oct. 17, 2017

(65) Prior Publication Data
US 2019/0116307 A1    Apr. 18, 2019

(51) Int. Cl.
| | | |
|---|---|---|
| *H04N 5/232* | (2006.01) | |
| *H04N 5/235* | (2006.01) | |
| *G03B 15/03* | (2006.01) | |
| *G03B 7/16* | (2014.01) | |
| *G03B 15/07* | (2006.01) | |

(52) U.S. Cl.
CPC .......... *H04N 5/23216* (2013.01); *G03B 7/16* (2013.01); *G03B 15/03* (2013.01); *G03B 15/07* (2013.01); *H04N 5/2353* (2013.01); *H04N 5/2354* (2013.01); *H04N 5/23293* (2013.01)

(58) Field of Classification Search
CPC ............. H04N 5/23216; H04N 5/2534; H04N 5/2353; H04N 5/23293; G03B 15/03; G03B 15/07; G03B 15/16
See application file for complete search history.

(56) References Cited

U.S. PATENT DOCUMENTS

| | | | | | |
|---|---|---|---|---|---|
| 5,227,830 | A | * | 7/1993 | Yoshihara | ............... G02B 7/285 396/121 |
| 5,548,120 | A | * | 8/1996 | Parker | ................ G01N 21/8901 250/341.7 |
| 5,585,841 | A | * | 12/1996 | Hardin | ................... H04N 1/407 348/163 |

(Continued)

OTHER PUBLICATIONS

"Restriction Requirement", U.S. Appl. No. 15/786,286, dated Sep. 21, 2018, 6 pages.

(Continued)

*Primary Examiner* — Daniel I Walsh
(74) *Attorney, Agent, or Firm* — SBMC

(57) ABSTRACT

In implementations of photography environment control, an environment controller is a device that maintains a photography environment map of an environment in which images are captured as photographs. The photography environment map includes locations of fixed light sources that are usable to illuminate a subject for image capture in a region of the environment. The environment controller implements an imaging recommendation module that can determine optimal lighting for the image capture of the subject in the region of the environment. The environment controller can then control the fixed light sources used to adjust ambient lighting conditions of the region in the environment for the optimal lighting and the image capture of the subject. The environment controller can also initiate communication of imaging recommendations to a camera device in the environment for the image capture of the subject.

20 Claims, 11 Drawing Sheets

(56) References Cited

U.S. PATENT DOCUMENTS

| | | | | |
|---|---|---|---|---|
| 7,850,338 B1* | 12/2010 | Messina | H04N 5/2354 | 362/11 |
| 9,225,910 B2* | 12/2015 | Lo | H04N 5/2354 | |
| 9,942,970 B2* | 4/2018 | Green | H05B 37/029 | |
| 9,955,551 B2* | 4/2018 | Spero | F21S 41/143 | |
| 9,986,140 B2* | 5/2018 | Collins | H04N 5/2256 | |
| 10,469,723 B2* | 11/2019 | Pincenti | H04N 5/2354 | |
| 2005/0143661 A1 | 6/2005 | Sato | | |
| 2005/0249486 A1* | 11/2005 | Murray | G03B 17/00 | 396/56 |
| 2005/0265014 A1* | 12/2005 | Matsui | G03B 15/05 | 362/5 |
| 2005/0281549 A1* | 12/2005 | Shih | G03B 7/08 | 396/57 |
| 2006/0171566 A1* | 8/2006 | Gindele | G02B 7/32 | 382/106 |
| 2007/0279427 A1* | 12/2007 | Marks | H04N 5/2226 | 345/581 |
| 2008/0070623 A1* | 3/2008 | Ogawa | H04N 5/232 | 455/556.1 |
| 2011/0153738 A1 | 6/2011 | Bedingfield | | |
| 2011/0249961 A1* | 10/2011 | Brunner | H04N 5/23216 | 396/213 |
| 2012/0199654 A1* | 8/2012 | Zhu | G06K 7/10732 | 235/455 |
| 2012/0200660 A1* | 8/2012 | Verthein | H05B 37/0218 | 348/14.08 |
| 2012/0206050 A1* | 8/2012 | Spero | B60Q 1/04 | 315/152 |
| 2014/0160307 A1* | 6/2014 | Ganesh | H04N 5/23206 | 348/207.11 |
| 2015/0142857 A1* | 5/2015 | Collins | H04N 5/2256 | 707/804 |
| 2015/0178592 A1* | 6/2015 | Ratcliff | H04N 5/23222 | 382/155 |
| 2015/0351204 A1* | 12/2015 | Hershberg | H05B 37/0272 | 315/153 |
| 2016/0112621 A1* | 4/2016 | Nishi | H04N 5/2354 | 348/234 |
| 2017/0064169 A1* | 3/2017 | Mishra | H05B 37/0272 | |
| 2017/0311413 A1* | 10/2017 | Moriwaki | H05B 37/0227 | |
| 2017/0367785 A1* | 12/2017 | Munari | A61C 1/088 | |
| 2018/0107096 A1* | 4/2018 | Hennings | G03B 15/05 | |
| 2018/0211440 A1* | 7/2018 | Kunkel | G06T 19/006 | |
| 2018/0220061 A1* | 8/2018 | Wang | G06K 9/00664 | |
| 2018/0347805 A1* | 12/2018 | Abou-Fadel | G06F 1/1632 | |
| 2018/0367721 A1 | 12/2018 | Fukazawa | | |
| 2019/0116301 A1* | 4/2019 | Pincenti | H04N 5/23206 | |
| 2019/0116307 A1* | 4/2019 | Pincenti | H04N 5/2351 | |

OTHER PUBLICATIONS

"Non-Final Office Action", U.S. Appl. No. 15/786,286, dated Dec. 27, 2018, 11 pages.

"Final Office Action", U.S. Appl. No. 15/786,286, dated Jun. 28, 2019, 15 pages.

"Notice of Allowance", U.S. Appl. No. 15/786,286, dated Aug. 27, 2019, 14 pages.

"Corrected Notice of Allowability", U.S. Appl. No. 15/786,286, dated Oct. 9, 2019, 2 pages.

* cited by examiner

PHOTOGRAPHY ENVIRONMENT CONTROL

BACKGROUND

Artificial flash lighting and natural lighting can be used to illuminate a photography subject, such as a person in a room or standing outdoors. However capturing photos in a room or outdoors can be challenging due to the lighting conditions, such as too dim or too bright of lighting levels. For example, the natural lighting in a room or outdoors may be too bright due to direct sunlight on the subject or through windows in the room. In the evening, the natural lighting may be too dim to capture an image of the subject, at least without a flash and resorting to an extended exposure duration. Further, both the artificial and natural lighting can cast unwanted shadows and reflections that diminish the quality of a captured image. Flash photography is a type of artificial lighting that can be used to augment exposure in low lighting situations, but can cause glare, red-eye, as well as the unwanted shadows and reflections. Further, most people carry only a small, fixed-flash camera device or have a camera and flash integrated in a mobile phone or tablet device. In low lighting situations, the small, fixed-flash of a camera device or mobile phone simply flashes directly toward the subject when capturing a photograph of the subject, which can result in the unwanted image characteristics.

BRIEF DESCRIPTION OF THE DRAWINGS

Implementations of photography lighting control and photography environment control are described with reference to the following Figures. The same numbers may be used throughout to reference similar features and components shown in the Figures.

DETAILED DESCRIPTION

Figure 1:
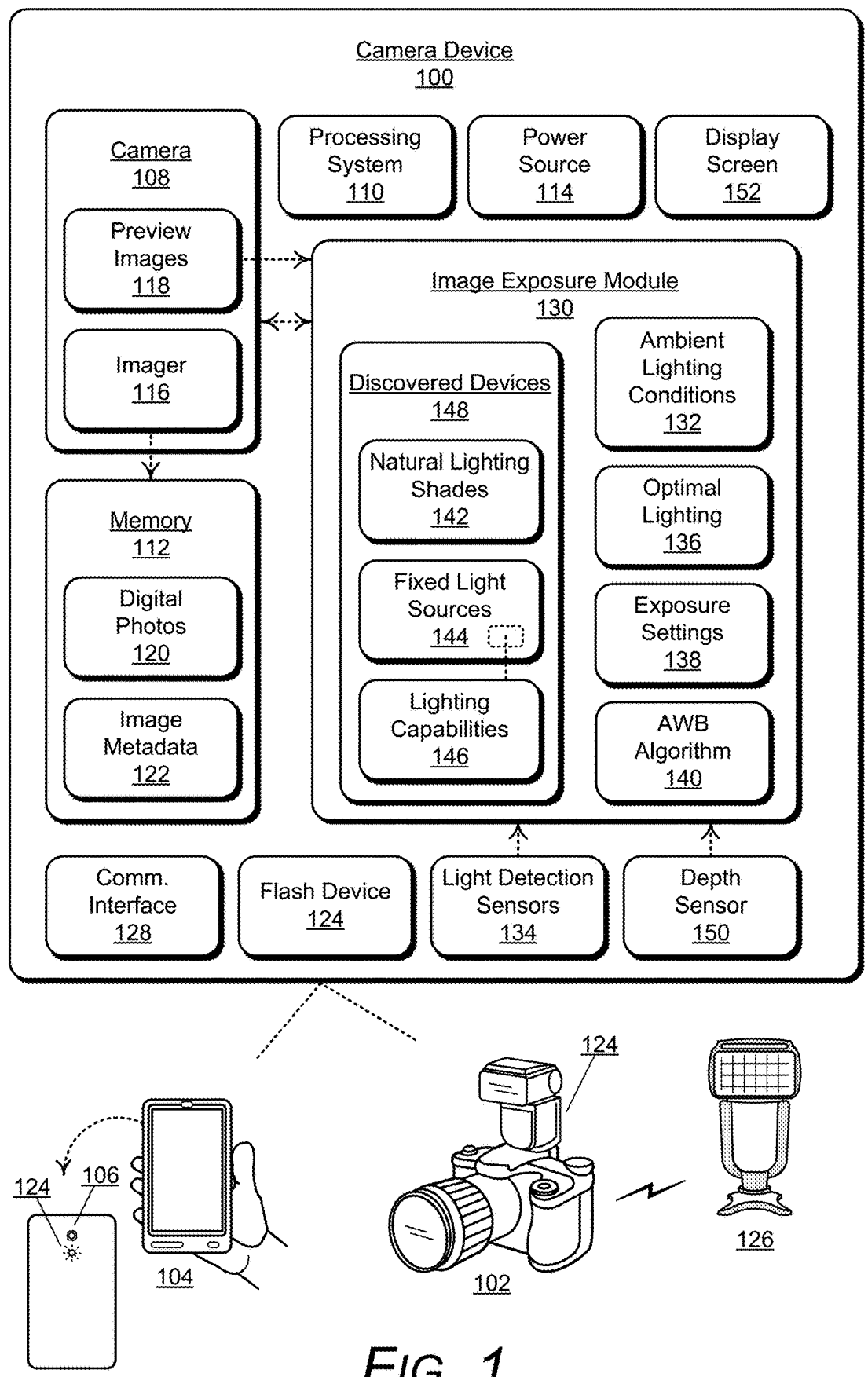
FIG. 1 illustrates an example camera device that can be used to implement techniques of photography lighting control as described herein.

Implementations of photography lighting control and photography environment control are described, and provide techniques to discover and/or utilize fixed light sources in a photo environment to illuminate a subject for image capture in low lighting environments. For example, a camera device can be implemented to interact with and control the fixed light sources in an environment (e.g., a room, outdoor patio, etc.) via wireless communication for coordinated flash and lighting using existing fixed lighting devices, such as plug-in lamps, canned ceiling lights, permanent fixtures, and other lights in and around a room. The fixed light sources in the environment can be utilized to illuminate a subject, such as a person, object, or other type of subject, for image capture in the environment. For example, a smart home or building may have smart connected light fixtures that are implemented in an Internet-of-things (IoT) ecosystem of connected devices and/or smart devices with home automation wireless communication protocols.

Additionally, a smart home environment may also have natural lighting shades that allow or block natural light entering the environment in which images of a subject are captured as digital photos. The natural lighting shades can include conventionally thought of window shades that raise and lower to block or allow natural light to enter a room, but may also include electronic window adjustments that can be turned-on or turned-off to block or allow the natural light to enter the room, as well as any other type of shade or natural light control device.

In aspects of photography lighting control, a camera device, such as any type of digital camera or mobile device that includes an integrated camera, can be used to capture a digital image of a subject in a photo environment. Generally, as a type of computing device, the camera device implements an image exposure module that can initially determine the ambient lighting conditions of an environment, such as before photographing a person in a room or in an outdoor environment. The image exposure module can also determine an optimal lighting (or approximate optimal lighting) for capturing digital images of a subject in the environment, as well as adjust the exposure settings of the camera device to coincide with the determined optimal lighting for the environment.

The image exposure module of the camera device can discover and control the fixed light sources that are usable to illuminate the photo subject in the environment and/or discover and control the natural lighting shades in the environment for capturing the digital images of the subject. A natural lighting shade can be controlled in the environment to adjust the ambient lighting conditions for the optimal lighting when capturing the digital images of the subject, such as by opening the natural lighting shade to allow the natural light entering the environment or by closing the natural lighting shade to block the natural light from entering the environment.

The features of photography lighting control and photography environment control described herein can make use of existing building or room lighting, and also has applicability using exterior home or building lighting, such as to turn-on or briefly brighten the exterior lighting for image capture outdoors in a low-light environment. These features can be incorporated with smart home connectability and devices that wirelessly communicate with each other, such as in a low power mesh network, wireless ad hoc network, and the like in an Internet-of-things (IoT) ecosystem of connected devices and/or smart devices with home automation wireless communication protocols.

In aspects of photography environment control, an environment controller, such as any type of electronic and/or computing device, can be implemented to control the lighting and/or shading devices in a photographic environment. Generally, as a type of computing device, the environment controller implements an imaging recommendation module that can also determine the ambient lighting conditions of an environment, such as before photographing a person in a room or in an outdoor environment. The imaging recommendation module of the environment controller can also determine an optimal lighting (or approximate optimal lighting) for capturing digital images of a subject in the environment, as well as control the natural light shades and/or the fixed light sources to coincide with the determined optimal lighting for a region of the environment to facilitate capturing digital images with a camera device.

The imaging recommendation module of the environment controller can be implemented to detect or discover when a camera device enters into a photographic environment, and wirelessly communicates with the camera device. The imaging recommendation module can also generate imaging recommendations for the camera device that communicates with the environment controller in the photographic environment. For example, the imaging recommendation module can determine various imaging recommendations, such as exposure settings of the camera device that coincide with the determined optimal lighting when capturing images of a subject in the environment. The environment controller can then communicate the determined optimal lighting to the camera device, along with the recommended camera exposure settings that are determined to coincide with the determined optimal lighting.

The imaging recommendation module of the environment controller can also determine other imaging recommendations for a camera device in the photographic environment. For example, the determined imaging recommendations can include a subject location and/or a camera location, such as where to position the subject and where to position the camera device for capturing an image in a region of the environment. In implementations, the imaging recommendation module of the environment controller can initiate flashing one of the fixed light sources in the environment at approximately the determined subject location as an indication of where a person should stand in a room for a photograph. The imaging recommendation module may also initiate audio feedback via an audio interface of the environment controller to provide audible positioning instructions that indicate the determined subject location of the subject and/or the determined camera location of the camera device in the environment.

The imaging recommendations for the locations of a subject and/or a camera device, as determined by the imaging recommendation module, can also be communicated from the environment controller to the camera device in the environment. The imaging recommendations for the subject location and the camera location are then displayable on a display screen of the camera device, such as a displayable indication of where to position the subject and/or the camera in the environment to capture an image of the subject at the determined optimal lighting.

As another feature, the imaging recommendation module 316 can develop historical imaging data corresponding to multiple image captures in the environment over time. The imaging recommendation module 316 can then determine a preferred image backdrop as a photo opportunity recommendation based on the historical imaging data. For example, the imaging recommendation module may determine that a fireplace setting in a room of the environment is a commonly used and preferred image backdrop when camera users capture digital photos. As the fireplace setting develops into a notable preferred image backdrop, the environment controller can communicate the photo opportunity recommendation to subsequent camera devices that are carried into the environment by users and discovered for wireless communication with the environment controller. The photo opportunity recommendation can be communicated from the environment controller to a camera device, and may also be displayable as a visual image of the image backdrop on the display screen of the camera device.

While features and concepts of photography lighting control and photography environment control can be implemented in any number of different devices, systems, environments, and/or configurations, implementations of photography lighting control and photography environment control are described in the context of the following example devices, systems, and methods.

FIG. 1 illustrates an example camera device 100 that can be used to implement techniques of photography lighting control as described herein. In this example, the camera device 100 may be any type of digital camera 102 or mobile device 104 that includes an integrated camera 106, such as a mobile phone or tablet device. The camera device 100 includes a camera 108 to capture digital images, and the integrated camera 106 in the mobile device 104 is an example of the camera 108. Generally, the camera device 100 is an electronic and/or computing device implemented with various components, such as a processing system 110 and memory 112, as well as any number and combination of different components as further described with reference to the example device shown in FIG. 11. For example, the camera device 100 can include a power source 114 to power the device, such as a rechargeable battery and/or any other type of active or passive power source that may be implemented in an electronic and/or computing device.

The camera device 100 includes the camera 108 that is implemented with an imager 116, which activates to generate preview images 118 and to capture digital images, such as digital photos 120 that are stored in the device memory 112. Generally, in terms of photography, a digital SLR (DSLR) camera can be used to generate the preview images 118 and capture the digital photos 120 as digital images. The preview images 118 can be generated by the camera 108 when a viewfinder of the camera device 100 is activated (e.g., turned-on) and the shutter button is pressed half-way to initiate generating the preview images, generally at approximately thirty frames per second. The photographer or user of the camera device 100 can then capture a digital photo 120 by fully pressing the shutter button, and the digital photo 120 can be based on an analysis of the lighting conditions and other image characteristics detected from the preview images 118.

A digital image that is captured with the camera 108 of the camera device 100 generally refers to the functions performed by the camera device 100 to image a digital photo when initiated by a photographer or user of the camera device to photograph a person, object, or other type of subject. In terms of digital photography, image metadata 122 of a captured image can also be recorded and stored in memory 112 along with a captured digital image, and the image metadata 122 can include such information as a timestamp (e.g., date and time), location data corresponding to when and where an image is captured, and any other information about a digital image, such as exposure and lighting characteristics. Other examples and uses of the image metadata 122 corresponding to the captured digital photos 120 are further described below with reference to recording aspects of lighting sources and then image processing the captured digital photos 120.

In this example, the camera device 100 includes a flash device 124 that may be an integrated flash component of the camera device 100, or may be an external, peripheral component that either attaches to the camera device or is in wireless communication with the camera device. For example, the mobile device 104 includes the flash device 124 as an integrated flash component of the device, along with the integrated camera 106. Alternatively, the flash device 124 may be an attachable component that attaches to the digital camera 102, such as a digital SLR (DSLR) camera, or the flash device 124 may be a standalone, external flash device 126 that is implemented for wireless communication with the digital camera 102. Generally, the flash device 124 has a flash array of light emitters, such as light emitting diodes (LEDs) or xenon flashes, that initiate a flash of light when a photographer or user of the camera device 100 initiates taking a photo in a low-light environment.

In implementations, the camera device 100 can include communication interfaces 128 corresponding to different wireless radio systems, such as for WiFi, Bluetooth™, Near-Field Communication (NFC), or any other wireless communication system or format, which generally includes a radio device, antenna, and chipset implemented for wireless communication with other devices. The camera device 100 also includes an image exposure module 130 that implements features of photography lighting control, as described herein. The image exposure module 130 may include independent processing, memory, and logic components as a computing and/or electronic device integrated with the camera device 100. Alternatively or in addition, the image exposure module 130 can be implemented as a software application or module, such as computer executable software instructions that are executable with a processor (e.g., the processing system 110) of the camera device 100. As a software application, the image exposure module 130 can be stored on computer-readable storage memory (e.g., the device memory 112), such as any suitable memory device or electronic data storage implemented in the camera device.

In aspects of photography lighting control, a photographer can use the camera device 100 to capture an image (e.g., a digital photo 120) of a subject in an environment, such as to photograph a person in a room or in an outdoor environment. The flash device 124 and/or the external flash device 126 may be utilized in a low-light environment to illuminate the subject for image capture. Alternatively or in addition to using a flash device, fixed light sources in an environment may be utilized to illuminate the subject for image capture in the environment. For example, a smart home or building may have smart connected light fixtures that are implemented in an Internet-of-things (IoT) ecosystem of connected devices and/or smart devices with home automation wireless communication protocols.

In the described techniques for photography lighting control, the image exposure module 130 of the camera device 100 is implemented to initially determine the ambient lighting conditions 132 of an environment, such as before photographing a person in a room or in an outdoor environment. Generally, the ambient lighting is the light already present in an environment before any additional lighting is added to enhance the illumination of a subject to be photographed. The ambient light of an environment may be provided by natural light, such as from the sun, moon, lightning, etc. either outdoors or coming through the windows of a room, for example. Alternatively or in addition, the ambient light may be provided by artificial lights, such as indoor room lights that are turned-on or exterior building lights that are turned-on in the evening. In this example, the camera device 100 includes one or more light detection sensors 134 that provide input to the image exposure module 130, which can determine the ambient lighting conditions 132 of an environment based on the inputs from the light detection sensors.

The image exposure module 130 can also determine an optimal lighting 136 (or approximate optimal lighting) for image capture of a subject in an environment as the digital photos 120. The image exposure module 130 can also adjust the exposure settings 138 of the camera device 100 to coincide with the determined optimal lighting 136 for an image capture of the subject in the environment. The determined optimal lighting 136 and the adjusted exposure settings 138 can include a determination as to whether the camera flash device 124 and/or an external flash device 126 is used to capture an image, such as in a low-light environment.

Along with determining the optimal lighting 136 and the exposure settings 138, the image exposure module 130 can utilize an auto white balance (AWB) algorithm 140 to color balance the environment lighting for image capture of a subject in the environment. The AWB algorithm 140 is implemented to adjust the intensities of typically the red, green, and blue primary colors and render the colors for color image correction. White balance removes unrealistic color casts so that objects which appear white in the environment are rendered white in a captured image. Given the ability to control the lighting of an environment as described herein, the AWB algorithm 140 can be adjusted based on anticipated lighting of the environment during image capture of the subject in the environment.

In the described techniques for photography lighting control, the camera device 100 is also implemented to discover natural lighting shades 142 that are operable to allow or block natural light entering an environment and/or discover fixed light sources 144 in the environment that are usable to illuminate a subject for image capture in the environment. The image exposure module 130 of the camera device 100 can be implemented to interact with and control the fixed light sources 144 in an environment (e.g., a room, outdoor patio, etc.) via wireless communication for coordinated flash and lighting using existing fixed lighting devices, such as the plug-in lamps, canned ceiling lights, permanent fixtures, and other lights in and around a room. The image exposure module 130 can also identify lighting capabilities 146 of the fixed light sources 144 that can be used to adjust the ambient lighting conditions 132 for the optimal lighting 136, such as to identify the type of each fixed light source, how bright a light source is, a lighting direction of the illumination from the light source, the color of the lighting from a light source, whether the light source has flash capability or not, etc. Controllable aspects of the fixed light sources (e.g., artificial light sources) may include spectra, intensity, directability, and any other type of controllable feature or aspect of interior and exterior fixed light sources.

Additionally, a smart home environment may also have the natural lighting shades 142 that allow or block natural light entering the environment in which images of a subject are captured as the digital photos 120. As used herein, natural lighting shades 142 can include conventionally thought of window shades that raise and lower to block or allow natural light to enter a room, but may also include electronic window adjustments that can be turned-on or turned-off to block or allow the natural light to enter the room, as well as any other type of shade device, window cover, skylight cover or control, and the like.

The described techniques for photography lighting control include the image exposure module 130 being implemented to evaluate various aspects of the lighting in an environment, such as the lighting levels, lighting color, ambient lighting conditions, direction of illumination, and optimal lighting for capturing an image of a subject in the environment. The image exposure module 130 can then initiate to control the discovered devices 148, such as the natural lighting shades 142 and the fixed light sources 144. For example, the image exposure module 130 can control dimming the available smart connected fixed light sources 144, briefly adjusting the lights brighter during image capture, turning some of the fixed light sources on and some off, adjusting the natural lighting shades 142 in the environment to increase or decrease the available natural light, and/or any other type of ambient light, natural light, and fixed light source adjustments.

In other aspects of photography lighting control, the photo environment analysis and control implemented by the image exposure module 130 can be used to change the overall illumination color in the environment for a brief moment so that a digital photo 120 of a subject is captured during the moment of optimal color and illumination of the environment. For example, instead of changing the color of the light that is emitted from the flash device 124, the color of an environment (e.g., a room in a house) can be changed using the fixed light sources in the room to match the flash lighting color, which provides a digital photo 120 that appears as if a flash was not used.

Additionally, the image exposure module 130 of the camera device 100 can be implemented to adjust and/or correct a captured image, such as a digital photo 120, by image processing utilizing the determined and/or stored lighting information, to include the lighting capabilities 146 and other image metadata 122, information, and/or stored parameters about the fixed light sources 144. The image processing of a captured digital photo 120 can be based on the lighting parameters, including the spectral capabilities of the fixed light sources 144, exposure control, color correction matrices, noise reduction in the images, tone mapping, and the like. The techniques for image processing of a captured digital photo 120 can also be used by the AWB algorithm 140 to solve or improve color casting issues in a captured image caused by having flash lighting of one color and also tungsten background lighting that does not correlate well with the flash lighting. The determined and stored lighting information, image metadata 122, and/or parameters can be utilized by the image exposure module 130 for image processing to correct the image of a digital photo 120 based on the spectral metadata from the fixed light sources 144 in a room or other region of the environment.

As described above, the image exposure module 130 of the camera device 100 can be used to discover the fixed light sources 144 in an environment that are usable to illuminate a subject for image capture in the environment. The image exposure module 130 of the camera device 100 can also interact with and control the fixed light sources 144 in the environment via wireless communication. Alternatively, in a passive sense, one or more of the fixed light sources 144 may already be turned-on, providing illumination of the subject in the environment for image capture, and rather than communicating to turn-on or otherwise control a fixed light source, the current lighting conditions are used as-is to capture an image of the subject as a digital photo 120. The image capture can occur with the existing illumination provided by the fixed light sources that are usable without additional communication or control.

In the example of using existing lighting in a passive sense, the image exposure module 130 of the camera device 100 can determine a fixed light source (or multiple ones of the fixed light sources 144) that can be used to illuminate a subject for image capture in an environment. The image metadata 122 can be recorded to include lighting information about the fixed light source that has been determined for the illumination. The image metadata 122 can also include an auto white balance (AWB) setting (or settings) for the digital photos 120. For example, the image metadata 122 can include the lighting information as a type of the fixed light source, such as whether the light is an incandescent, fluorescent, LED, or other type of light source. The lighting information can also include an indication of the brightness of the fixed light source, and a color temperature of the fixed light source, as well as a full light spectrum of the fixed light source.

The AWB algorithm 140 of the image exposure module 130 can determine the white balance settings for a digital photo 120 as derived from the full light spectrum for the fixed light source from the lighting information in the image metadata 122. For instance, the white balancing x,y coordinates for an image can be derived from the full light spectrum that corresponds to the fixed light source. Generally, a transfer matrix can be utilized by the AWB algorithm 140 to transform RGB color space image data to x,y,z chromatic coordinates. Additionally, the AWB algorithm 140 of the image exposure module 130 can initiate to lock the white balance settings and/or narrow application of the AWB algorithm based on the lighting information for the image capture. As noted above, the image exposure module 130 can also perform image processing of a captured digital photo 120 utilizing the AWB settings with the AWB algorithm, and image processing based on the other lighting information that corresponds to the fixed light source used to illuminate the subject in an environment during the image capture.

The coordinated lighting techniques described herein are also useful for capturing digital photos 120 of faster moving subjects, such as kids and pets, particularly in a room where the lighting level can be increased for a moment so as to benefit from a faster frame rate, and then the room lights are decreased back down to a comfortable lighting level for the people in the room. The described techniques can make use of existing building or room lighting, and has applicability using exterior home or building lighting, such as to turn-on or briefly brighten the exterior lighting for image capture outdoors in a low-light environment. These features can be incorporated with smart home connectability and Internet-of-things (IoT) devices that wirelessly communicate with each other, such as in a low power mesh network, wireless ad hoc network, and the like. Examples of photography lighting control using the camera device 100 in an environment with fixed light sources 144 and/or natural lighting shades 142 is shown and described with reference to FIG. 2.

Figure 2:
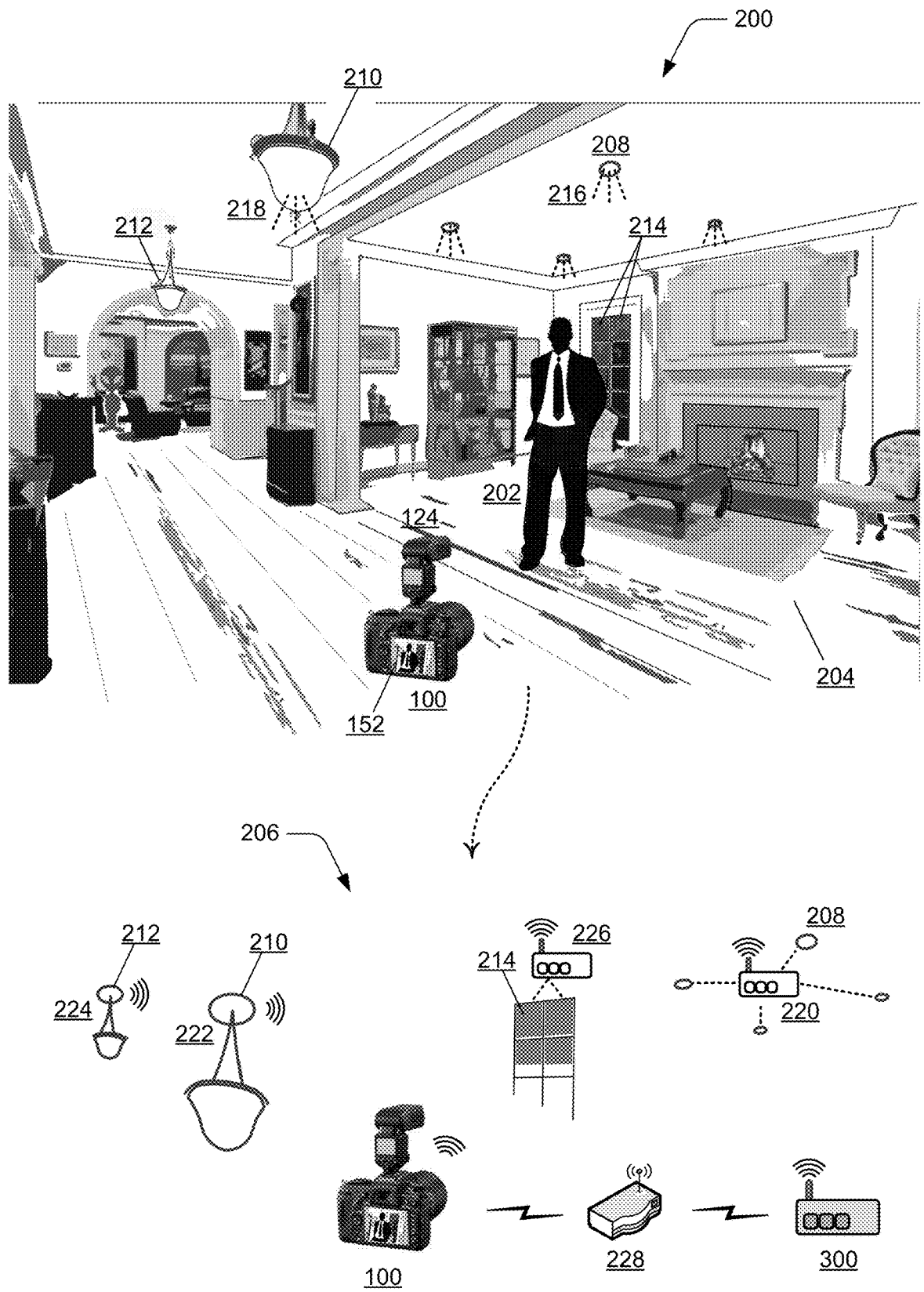
FIG. 2 illustrates an example of photography lighting control utilizing the example camera device to implement the techniques described herein.

FIG. 2 illustrates an example 200 of photography lighting control utilizing the example camera device 100 to implement the techniques described herein. As shown in the example 200, a person standing in a room is the subject 202 in an environment 204 who is being photographed with the camera device 100. Initially, the image exposure module 130 of the camera device 100 can determine the ambient lighting conditions 132 of the environment 204, such as based on inputs from the light detection sensor or sensors 134. The image exposure module 130 can also determine the optimal lighting 136 (or approximate optimal lighting) for image capture of the subject 202 in the environment 204. The optimal lighting 136 can be determined from the preview images 118 that are generated with the imager 116 of the camera 108 prior to the final image capture of the subject 202 being photographed in the environment 204.

In implementations, the image exposure module 130 can detect features of the environment from the preview images 118. For example, the image exposure module 130 can detect the subject 202 to be photographed in the environment, such as the person standing in the room as the subject 202 in the environment 204 who is being photographed with the camera device 100. In this example, the image exposure module 130 may be also be implemented for facial recognition detection to detect the faces of subjects being photographed, and provide a location of a subject in a photo environment relative to the position of the camera device 100. To determine the relative positioning of the subject 202 in the environment 204, the camera device 100 can include a depth sensor 150, such as an infra-red (IR) LED and imager, implemented to detect the depth of the subject and environment features relative to the camera device 100 and relative to the position of the subject 202 to be photographed in the environment. In implementations, the depth sensor 150 may be implemented as a phase detect auto-focus (PDAF) feature of the camera device 100, and the image exposure module 130 can determine depth in the images from the interlaced pixels of the PDAF feature.

Generally, a preview image 118 and the current viewpoint of the camera is shown displayed on a display screen 152 of the camera device 100. From the preview images 118 that are generated, the image exposure module 130 can also determine the ambient lighting conditions 132 of the environment 204, as well as analyze the color and brightness characteristics of the environment. Additionally, using the depth sensor 150, the image exposure module 130 can determine a position of the subject 202 in the environment 204 relative to the fixed light sources 144, and select the fixed light sources that are in a position to illuminate the subject for image capture.

In this example 200, the environment 204 is a smart home that has smart connected light fixtures and/or natural lighting shades that are implemented in an Internet-of-things (IoT) ecosystem 206 of connected devices and/or smart devices with home automation wireless communication protocols. The image exposure module 130 of the camera device 100 can discover the fixed light sources 144 that are usable to illuminate the subject 202 for image capture in the environment 204. In this example 200, the fixed light sources 144 include several canned ceiling lights 208 and two hanging light fixtures 210, 212 (e.g., shown both in the example 200 and in the simpler illustration of the ecosystem 206). As noted above, the image exposure module 130 can identify the lighting capabilities of each of the fixed light sources 144 that can be used to adjust the ambient lighting conditions 132 for the optimal lighting 136 in the environment 204.

The image exposure module 130 of the camera device 100 can also discover natural lighting shades 214 that are operable to allow or block natural light entering the environment 204 through the windows. The discovered devices 148 in the environment 204, to include the natural lighting shades 214 and the fixed light sources 144, can be mapped by the image exposure module 130 to establish the position of each of the discovered devices 148 in the environment 204 and to correlate the position of the discovered devices relative to the location of the subject 202 in the environment.

For image capture of the subject 202 in the environment 204, and based on the mapping of the discovered devices 148, the image exposure module 130 can identify the fixed light sources 144 that are in a position to illuminate the subject 202 in the environment 204 and/or adjust the ambient lighting conditions 132 for the optimal lighting 136. In this example 200, the image exposure module 130 can identify that the light 216 from the various canned ceiling lights 208, as well as the light 218 from the hanging light fixture 210, will illuminate the subject 202 in the environment 204 based on the location of the subject 202 relative to the position of the identified lights. The image exposure module 130 can also identify that the hanging light fixture 212 will not provide illumination of the subject 202 during image capture in the environment 204. As described above, the image exposure module 130 is implemented to adjust the exposure settings 138 of the camera device 100 to coincide with the determined optimal lighting 136, along with use of the fixed light sources 144, the natural lighting shades 214, and/or with use of the flash device 124 for the image capture of the subject 202 in the environment 204.

As shown in the ecosystem 206, the image exposure module 130 of the camera device 100 can initiate wireless communication via the communication interface 128 with controllers of the discovered devices 148. For example, the camera device 100 can communicate with a controller 220 of the several canned ceiling lights 208, with respective controllers 222, 224 of the hanging light fixtures 210, 212, and/or with a controller 226 of the natural lighting shades 214. Although the several canned ceiling lights 208 are shown and described as being controlled by the one controller 220, each of the canned ceiling lights 208 may be individually controlled by the one controller 220, or each of the canned ceiling lights 208 may be controlled by its own individual controller.

Similarly, although the natural lighting shades 214 are shown and described as being controlled by the one controller 226, each of the natural lighting shades 214 may be individually controlled by the one controller 226, or each of the natural lighting shades 214 may be controlled by its own individual controller. In implementations, the camera device 100 may wirelessly communicate directly with the controllers of the discovered devices 148 using Bluetooth™, NFC, or similar short-range communication techniques. Similarly, the camera device 100 may wirelessly communicate with the controllers of the discovered devices 148 via WiFi through a router device 228 that establishes a local network for connectivity of the various devices and/or the controllers in the environment 204. In aspects of photography environment control, the camera device 100 may also wirelessly communicate with an environment controller 300 via WiFi through the router device 228 and/or using any other communication protocol. Examples of photography environment control using the environment controller 300 in a photographic environment are shown and described with reference to FIGS. 3 and 4.

The image exposure module 130 of the camera device 100 can then control the fixed light sources 144, such as to turn a fixed light source on or off, to adjust the ambient lighting conditions 132 of the environment 204 for the optimal lighting 136 and image capture of the subject 202. Alternatively or in addition, the image exposure module 130 can control the natural lighting shades 214 to adjust the ambient lighting conditions 132 for the optimal lighting 136, such as to open a natural lighting shade allowing the natural light to enter the environment, or to close a natural lighting shade blocking the natural light from entering the environment.

Figure 3:
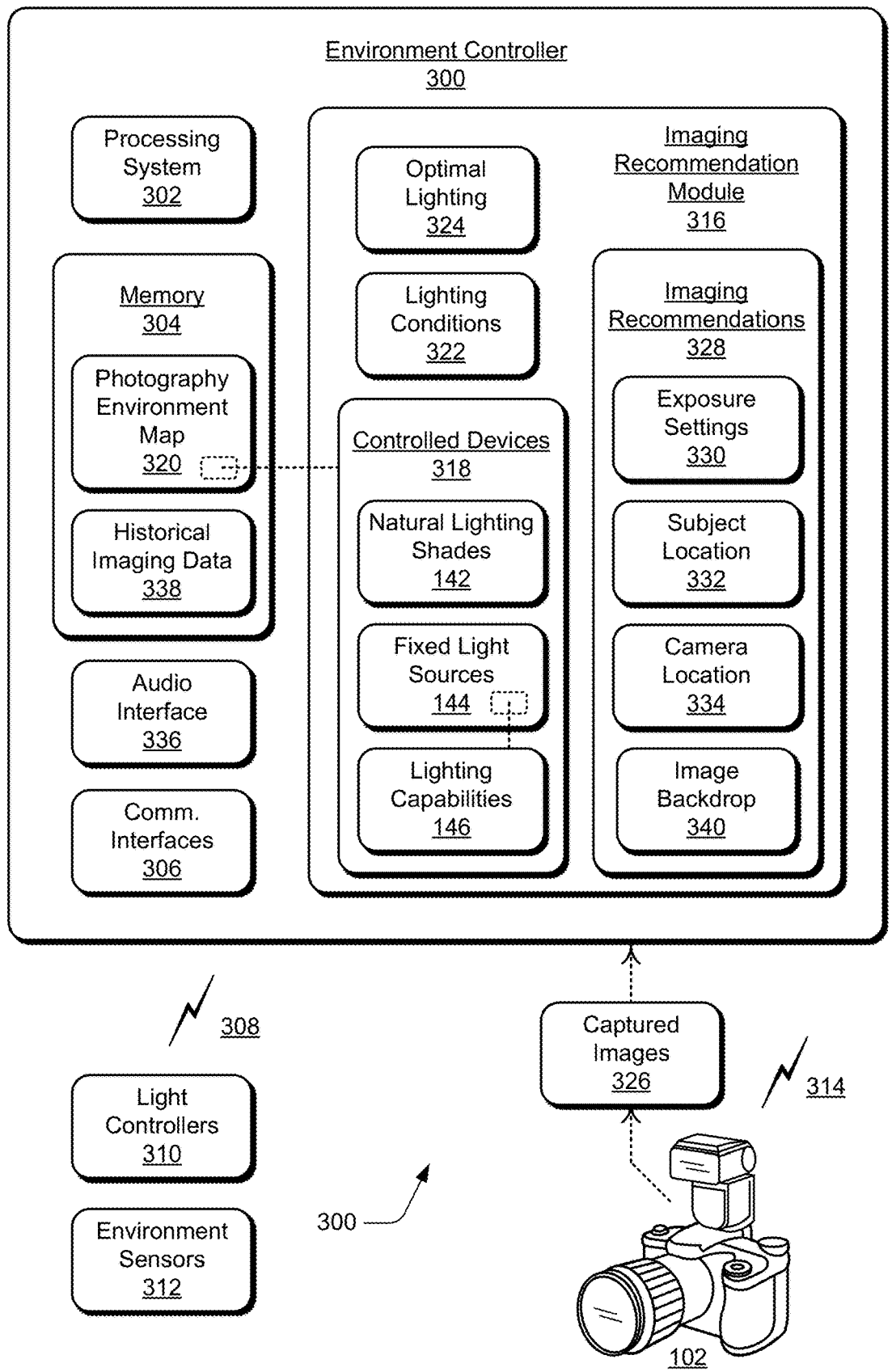
FIG. 3 illustrates an example environment controller that can be used to implement techniques of photography environment control as described herein.

FIG. 3 illustrates the example environment controller 300 that can be used to implement techniques of photography environment control as described herein. In this example, the environment controller 300 is a computing device that is implemented to control the photographic conditions of an environment in which a user with the camera device 100 may want to capture digital images (e.g., the digital photos 120). Generally, the environment controller 300 is an electronic and/or computing device implemented with various components, such as a processing system 302 and memory 304, as well as any number and combination of different components as further described with reference to the example device shown in FIG. 11. Although shown and described as an independent device, such as in FIG. 2, the environment controller 300 may be implemented as a component of the router device 228, or vice-versa.

In implementations, the environment controller 300 can include communication interfaces 306 corresponding to different wireless radio systems, such as for WiFi, Bluetooth™, Near-Field Communication (NFC), or any other wireless communication system or format, which generally includes a radio device, antenna, and chipset implemented for wireless communication with other devices. Additionally, the environment controller 300 may be a smart home controller, such as shown in FIG. 2 implemented in the Internet-of-things (IoT) ecosystem 206 of connected devices and/or smart devices with home automation wireless communication protocols. For example, the environment controller 300 can wirelessly communicate 308 with the light controllers 310, such as in the environment 204, and/or communicate with one or more environment sensors 312.

Examples of the light controllers 310 include the controller 220 of the several canned ceiling lights 208, the light controllers 222, 224 of the respective hanging light fixtures 210, 212, and the light controller 226 of the natural lighting shades 214 in the ecosystem 206 of the connected devices and/or smart devices in the environment 204 shown in FIG. 2. The environment controller 300 can also wirelessly communicate 314 with the camera device 100 in the environment 204. In this example shown in FIG. 3, the camera device 100 is illustrated as the digital SLR (DSLR) camera 102, but may also include the mobile device 104, such as a mobile phone that has the integrated camera 106 and flash device 124.

The environment controller 300 includes an imaging recommendation module 316 that implements features of photography environment control, as described herein. The imaging recommendation module 316 may include independent processing, memory, and logic components as a computing and/or electronic device integrated with the environment controller 300. Alternatively or in addition, the imaging recommendation module 316 can be implemented as a software application or module, such as computer executable software instructions that are executable with a processor (e.g., the processing system 302) of the environment controller 300. As a software application, the imaging recommendation module 316 can be stored on computer-readable storage memory (e.g., the device memory 304), such as any suitable memory device or electronic data storage implemented in the environment controller device.

In aspects of photography environment control, the environment controller 300 can detect or discover when the camera device 100 enters into the photographic environment 204, and communicates with the camera device, such as via the router device 228. For example, the environment controller 300 can be implemented with any one of several device discovery utilities to detect a device configured for wireless communication, such as the camera device 100 when a user carries the camera into the ecosystem 206 of connected devices in a home automation wireless communication environment.

The imaging recommendation module 316 is implemented to manage and communicate with the controlled devices 318, which includes the natural lighting shades 142 and the fixed light sources 144. As described above, the natural lighting shades 142 are controllable to allow or block natural light entering a region of the photography environment 204, and the fixed light sources 144 are controllable in the environment to illuminate a subject for image capture in a region of the environment. The imaging recommendation module 316 is implemented to develop and maintain a photography environment map 320 of the environment 204, and the photography environment map 320 is stored in the device memory 304.

The photography environment map 320 includes the locations of the natural lighting shades 142 in the environment 204, as well as the locations of the fixed light sources 144 that are usable to illuminate the subject 202 for image capture in a region of the environment. The photography environment map 320 can also include indications of the lighting capabilities 146 of the fixed light sources 144, as well as indications of light sources in the environment that are not device controllable. Generally an environment may have mixed lighting capabilities, with both device controllable fixed light sources 144 and other lighting sources that are manually controlled (e.g., turned-on or turned-off) by a user. In implementations, the photography environment map 320 can be communicated from the environment controller 300 to the digital camera 102 that utilizes the photography environment map 320 to determine the fixed light sources 144 and/or the natural lighting shades 142 that are usable to optimize the lighting conditions for the image capture of the subject 202 in the region of the environment.

The imaging recommendation module 316 can determine the lighting conditions 322 (e.g., the ambient lighting conditions 132) of the region in the environment 204 based on inputs from the environment sensors 312, such as light detection sensors, security cameras in the environment, and any other types of environment sensors that may be utilized. The imaging recommendation module 316 may also receive lighting condition inputs from the digital camera 102 that utilizes the light detection sensors 134 of the device, and the imaging recommendation module 316 determines the ambient lighting conditions 322 of the region in the environment based on the lighting condition inputs from the camera. The imaging recommendation module 316 can then determine the optimal lighting 324 for the image capture of the subject 202 in the region of the environment 204. The imaging recommendation module 316 may also receive captured images 326 (e.g., digital photos 120) from the digital camera 102 and determine the optimal lighting 324 for a particular region of the environment from the captured images. Further, the imaging recommendation module 316 can be implemented to utilize any combination of the environment sensors 312, lighting condition inputs from the digital camera 102, and/or the captured images 326 to determine the lighting conditions 322 and the optimal lighting 324 for a region of the environment.

Various regions of an environment, such as different rooms, a hallway, and an entryway in a house likely have different ambient lighting conditions 322 and an optimal lighting 324, depending on a time of the day or night, and based on the locations of the controlled devices 318 in the environment. Similarly, different regions of an outdoor environment, such as next to the house or in the yard, are likely to have different ambient lighting conditions 322 and an optimal lighting 324, depending on a time of the day or night, and based on the locations of exterior lighting.

The imaging recommendation module 316 can control the natural lighting shades 142 and/or the fixed light sources 144 to adjust the ambient lighting conditions 322 of a region in the environment 204 for the optimal lighting 324 and the image capture of the subject. As described above, the image exposure module 130 of the camera device 100 may also be implemented to interact with and control the natural lighting shades 142 and the fixed light sources 144 in an environment via wireless communication for coordinated flash and lighting using the existing fixed lighting devices. In implementations, the imaging recommendation module 316 of the environment controller 300 communicates with the image exposure module 130 of the camera device 100 to coordinate control of the natural lighting shades 142 and/or the fixed light sources 144 in the environment for the image capture in optimal lighting.

Similar to the image processing capabilities of the image exposure module 130 that is implemented in the camera device 100, as described above, the imaging recommendation module 316 in the environment controller 300 can be implemented to also adjust and/or correct a captured image 326 received from the digital camera 102 by image processing utilizing the determined and/or stored lighting information, to include the lighting capabilities 146 and other image metadata, information, and/or stored parameters about the fixed light sources 144. The image processing of a captured image 326 can be based on the lighting parameters, including the spectral capabilities of the fixed light sources 144, exposure control, color correction matrices, noise reduction in the images, tone mapping, and the like. The determined and stored lighting information, image metadata, and/or parameters can be utilized by the imaging recommendation module 316 for image processing to correct the captured images 326 based on the spectral metadata from the fixed light sources 144 in a room or other region of the environment.

The imaging recommendation module 316 can also generate imaging recommendations 328 for a camera device 100 that communicates with the environment controller 300 in the photographic environment 204. For example, the imaging recommendation module 316 can determine various imaging recommendations, such as exposure settings 330 of the camera device that coincide with the determined optimal lighting 324 for the image capture of the subject in a region of the environment. The environment controller 300 can communicate, via a communication interface 306, the optimal lighting 324 to the digital camera 102, along with the recommended camera exposure settings 330 that are determined to coincide with the determined optimal lighting for the image capture of the subject in the environment.

The imaging recommendations 328 determined by the imaging recommendation module 316 may also include a subject location 332 and/or a camera location 334, such as where to position the subject 202 and where to position the camera device 100 for an image capture in a region of the environment 204. The recommended subject location 332 of where to position the subject 202 and/or the recommended camera location 334 of where to position the camera device 100 can be determined to coincide with the determined optimal lighting 324 in a region of the environment.

In implementations, the imaging recommendation module 316 of the environment controller 300 can initiate flashing one of the fixed light sources 144 in the environment 204 at approximately the determined subject location 332 as an indication of where to position the subject for the image capture. For example, the imaging recommendation module 316 of the environment controller 300 can control one of the canned ceiling lights 208 above the subject 202, causing the canned ceiling light 208 to flash as an indication of where the person should stand in the room for the photograph. Alternatively or in addition, the imaging recommendation module 316 can initiate audio feedback via an audio interface 336 of the environment controller 300 to provide audible positioning instructions that indicate the determined subject location 332 of the subject 202 and/or the determined camera location 334 of the camera device 100 in the environment.

The imaging recommendations 328 for the subject location 332 and the camera location 334 can also be communicated from the environment controller 300 to the digital camera 102 in the environment for the image capture of the subject. In implementations, the imaging recommendations for the subject location 332 and the camera location 334 are displayable on the display screen 152 of the camera device, such as a displayable indication of where to position the subject and/or the camera in the environment for the image capture at the determined optimal lighting 324.

As another feature, the imaging recommendation module 316 can be implemented to develop historical imaging data 338 corresponding to multiple image captures in the environment over time. The historical imaging data 338 can include any type of information about the digital photographs that are captured in the environment, such as tagged features and locations in the photographic environment, subject and camera positional and exposure information, as well as an assessment of the image results as determined by the imaging recommendation module. The imaging recommendation module 316 can also determine a preferred image backdrop 340 as a photo opportunity recommendation based on the historical imaging data 338. For example, the imaging recommendation module 316 may determine that the fireplace setting in the room of the environment 204 is a commonly used and preferred image backdrop when camera users capture the digital photos 120. As the fireplace setting develops into a notable preferred image backdrop 340, the environment controller 300 can communicate the photo opportunity recommendation to subsequent camera devices that are carried into the environment 204 by users and discovered for wireless communication with the environment controller. The photo opportunity recommendation can be communicated from the environment controller 300 to the digital camera 102, and may also be displayable as a visual image of the image backdrop 340 on the display screen 152 of the camera device.

Figure 4:
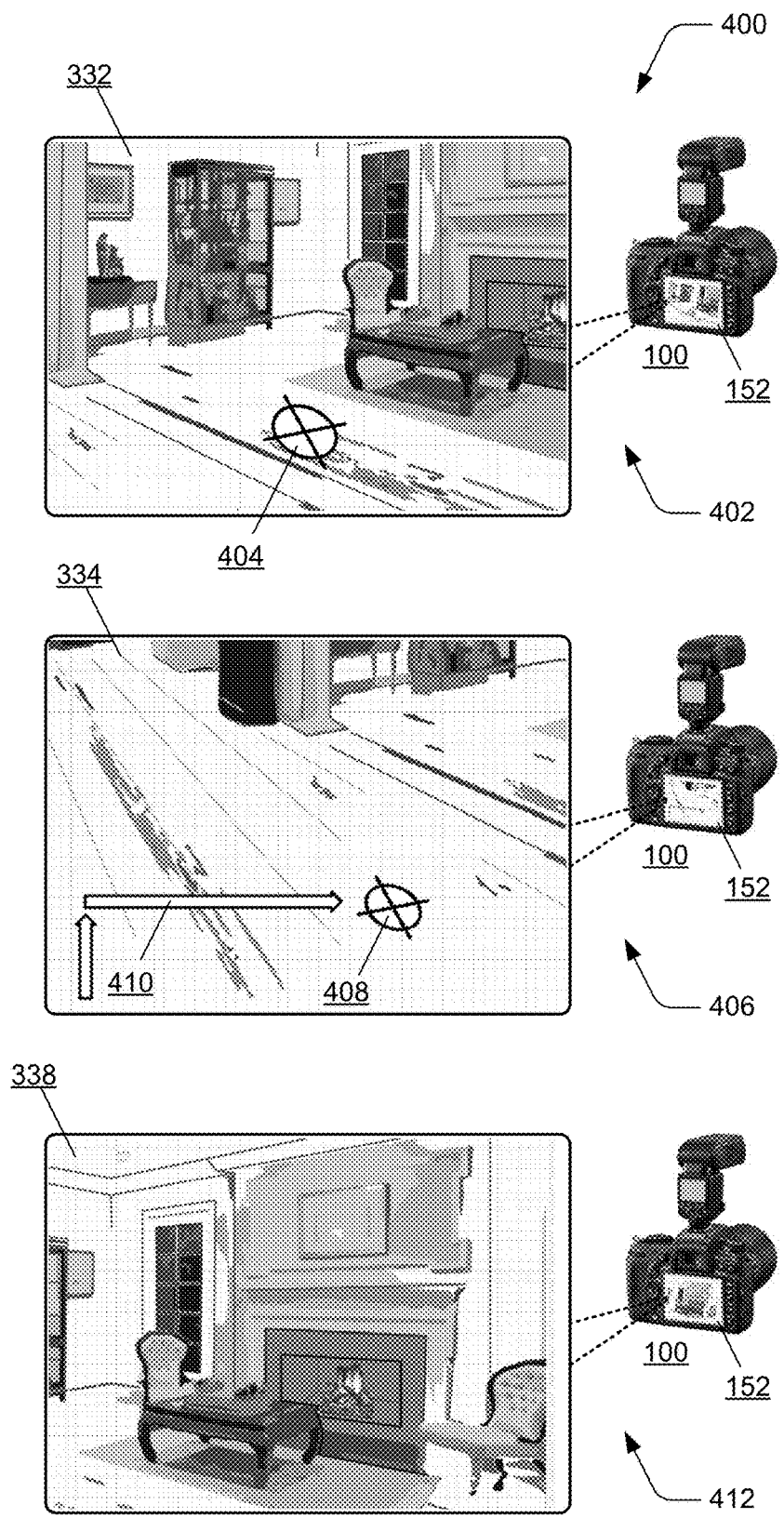
FIG. 4 illustrates examples of photography environment control utilizing the example environment controller communicating with a camera device to implement the techniques described herein.

FIG. 4 illustrates examples 400 in aspects of photography environment control utilizing the example environment controller 300 that communicates with the camera device 100 to implement the techniques described herein. As shown in the example 200 in FIG. 2, a person standing in a room is the subject 202 in a region of the environment 204 who is being photographed with the camera device 100. As described above, the imaging recommendation module 316 that is implemented in the environment controller 300 can generate the imaging recommendations 328, which are then communicated to the camera device 100. For example, the imaging recommendation module 316 can determine the subject location 332 as an imaging recommendation 328 of where to position the subject 202 in the region of the environment 204. As shown in the example at 402, the imaging recommendation of the subject location 332 is displayable on the display screen 152 of the camera device 100, and includes a displayable indication 404 of where to position the subject in the environment for the image capture.

The imaging recommendation module 316 can also determine the camera location 334 as an imaging recommendation 328 of where to position the camera device 100 in the region of the environment 204. As shown in the example at 406, the imaging recommendation of the camera location 334 is displayable on the display screen 152 of the camera device 100, and includes a displayable indication 408 of where to position the camera in the environment for the image capture. The displayable imaging recommendation can also include direction indications 410 that guide a user of the camera from a current location to the recommended camera location (e.g., to the displayable indication 408 of where to position the camera). In addition, or as an alternative, to the direction indications 410 displayed on the display screen 152 of the camera device, other positioning indications or instructions may be generated, such as audible instructions or displayed indications to move the subject or camera to the left, right, back, up, down, or in any other direction.

The imaging recommendation module 316 can also determine the preferred image backdrop 340 as a photo opportunity recommendation in the environment 204, such as the fireplace setting in the room of the environment. As shown in the example at 412, the imaging recommendation of the preferred image backdrop 340 is displayable on the display screen 152 of the camera device 100 as a photo opportunity recommendation in the environment for the image capture.

Example methods 500-1000 are described with reference to respective FIGS. 5-10 in accordance with one or more example implementations of photography lighting control and/or photography environment control. Generally, any of the components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
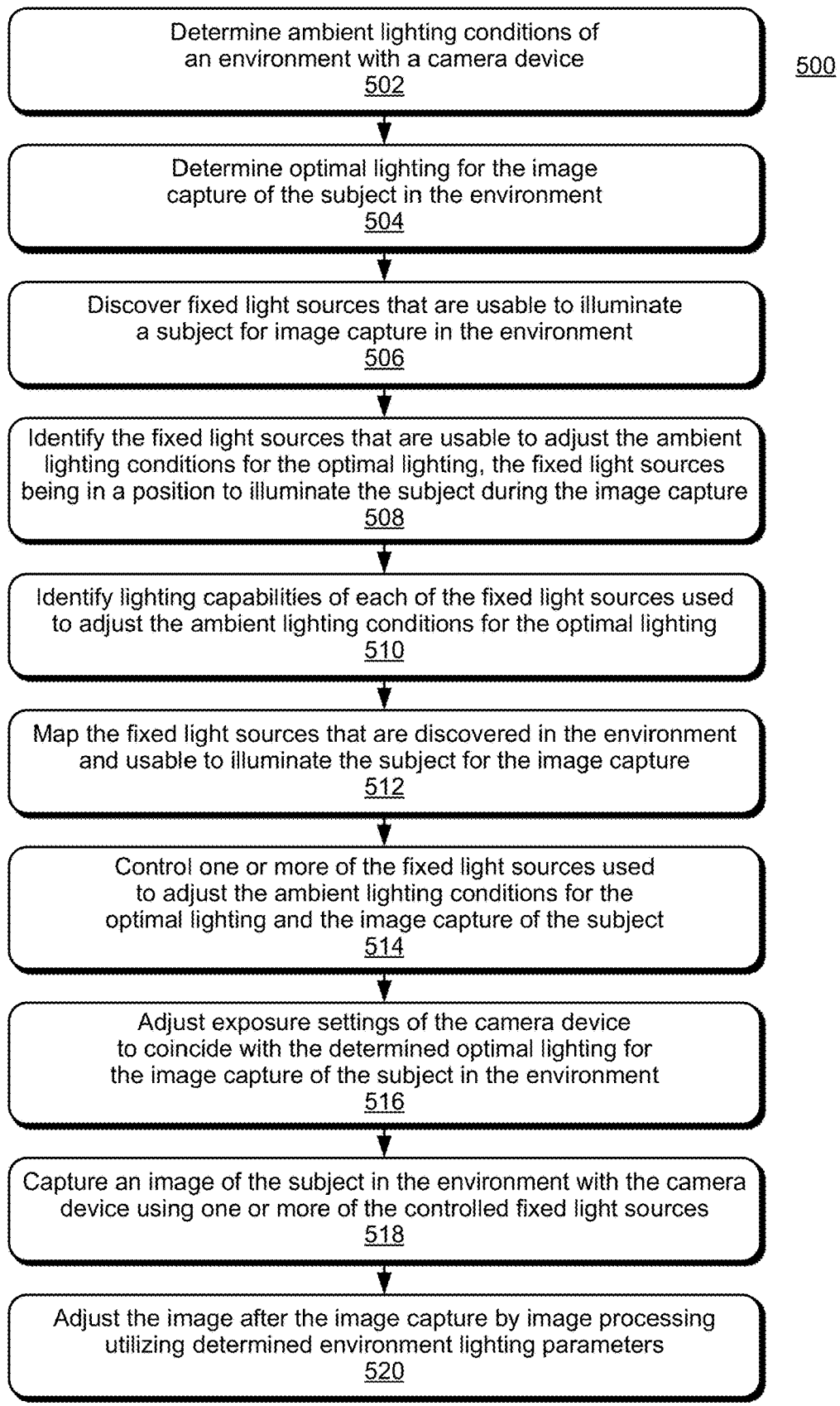
FIG. 5 illustrates an example method of photography lighting control in accordance with one or more implementations of the techniques described herein.

FIG. 5 illustrates an example method 500 of photography lighting control, and the method is generally described with reference to the image exposure module implemented in a camera device. The order in which the method is described is not intended to be construed as a limitation, and any number or combination of the described method operations can be performed in any order to perform a method, or an alternate method.

At 502, ambient lighting conditions of an environment are determined with a camera device. For example, the image exposure module 130 implemented by the camera device 100 determines the ambient lighting conditions 132 of the environment 204 for image capture of the subject 202 in the environment. Generally, the ambient lighting is the light already present in an environment before any additional lighting is added to enhance the illumination of a subject to be photographed, and the ambient light of an environment may be provided by natural light and/or artificial lights.

At 504, optimal lighting is determined for the image capture of the subject in the environment. For example, the image exposure module 130 of the camera device 100 determines the optimal lighting 136 (or approximate optimal lighting) for the image capture of the subject 202 in the environment 204 as the digital photos 120. The optimal lighting 136 can be determined from the preview images 118 that are generated with the imager 116 of the camera 108 prior to the final image capture of the subject 202 being photographed in the environment 204.

At 506, fixed light sources that are usable to illuminate a subject for image capture in the environment are discovered. For example, the image exposure module 130 of the camera device 100 discovers the fixed light sources 144 that are usable to illuminate the subject 202 for image capture in the environment 204, such as the several canned ceiling lights 208 and the two hanging light fixtures 210, 212 in the smart home ecosystem 206 of the environment 204.

At 508, one or more of the fixed light sources usable to adjust the ambient lighting conditions for the optimal lighting are identified based on the fixed light sources being in a position to illuminate the subject in the environment during the image capture. For example, the image exposure module 130 of the camera device 100 identifies that the light 216 from the various canned ceiling lights 208, as well as the light 218 from the hanging light fixture 210, will illuminate the subject 202 in the environment 204 based on the location of the subject 202 relative to the position of the identified lights.

At 510, lighting capabilities are identified for each of the fixed light sources used to adjust the ambient lighting conditions for the optimal lighting. For example, the image exposure module 130 of the camera device identifies the lighting capabilities 146 of the fixed light sources 144 that are used to adjust the ambient lighting conditions 132 for the optimal lighting 136, such as the type of each fixed light source, how bright a light source is, a lighting direction of the illumination from the light source, the color of the lighting from a light source, whether the light source has flash capability or not, etc.

At 512, the fixed light sources that are discovered in the environment and usable to illuminate the subject for the image capture are mapped. For example, the image exposure module 130 of the camera device 100 maps the discovered devices 148 that are discovered in the environment 204, to include the natural lighting shades 214 and the fixed light sources 144, establishing the position of each of the discovered devices 148 in the environment 204 and correlating the position of the discovered devices relative to the location of the subject 202 in the environment.

At 514, one or more of the fixed light sources are controlled and used to adjust the ambient lighting conditions for the optimal lighting and the image capture of the subject. For example, the image exposure module 130 of the camera device 100 controls the fixed light sources 144 and wirelessly communicates with a controller or controllers of the fixed light sources to discover the light sources and control the light sources, such as by turning one or more of the fixed light sources on or off to achieve the optimal lighting.

At 516, exposure settings of the camera device are adjusted to coincide with the determined optimal lighting for the image capture of the subject in the environment. For example, the image exposure module 130 of the camera device 100 adjusts the exposure settings 138 of the camera device to coincide with the determined optimal lighting 136 for the image capture of the subject 202 in the environment 204. The determined optimal lighting 136 and the adjusted exposure settings 138 can include determining whether the camera flash device 124 and/or an external flash device 126 is used to capture an image, such as in a low-light environment.

At 518, an image of the subject in the environment is captured with the camera device using the one or more controlled fixed light sources. For example, the imager of the camera 108 in the camera device 100 captures the digital photos 120 of the subject 202 in the environment 204 using the fixed light sources 144 and/or the flash device 124 for the image capture of the subject 202.

At 520, the image is adjusted after image capture by image processing utilizing determined environment lighting parameters. For example, the image exposure module 130 implemented in the camera device 100 adjusts and/or corrects a captured digital photo 120 by image processing utilizing the determined and/or stored lighting information, such as the lighting capabilities 146 and other image metadata 122, information, and/or parameters about the fixed light sources 144. The image processing of a captured digital photo 120 by the image exposure module 130 can be based on the lighting parameters, including the spectral capabilities of the fixed light sources 144, exposure control, color correction matrices, noise reduction in the images, tone mapping, and the like.

Figure 6:
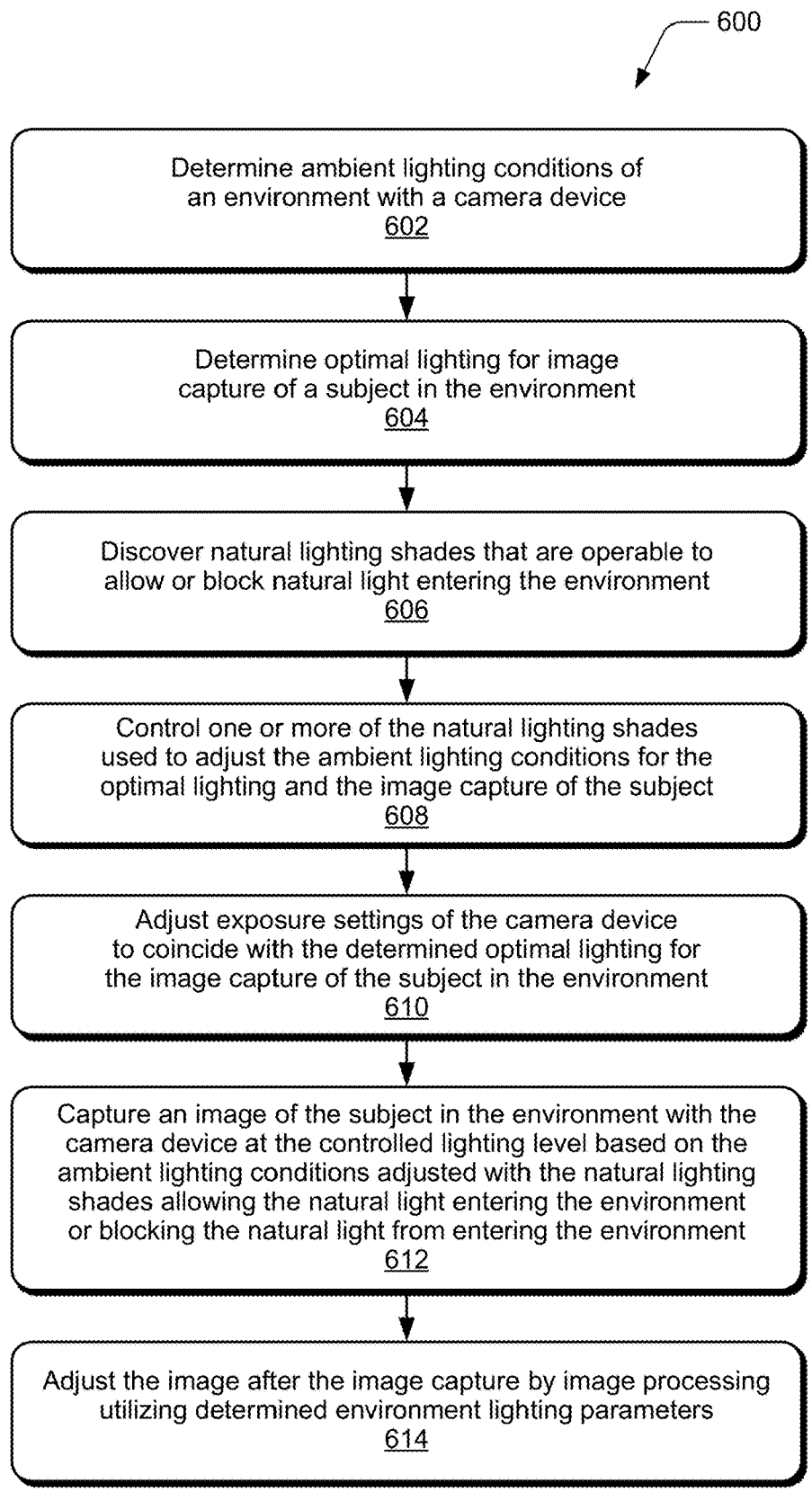
FIG. 6 illustrates an example method of photography lighting control in accordance with one or more implementations of the techniques described herein.

FIG. 6 illustrates an example method 600 of photography lighting control, and the method is generally described with reference to the image exposure module implemented in a camera device. The order in which the method is described is not intended to be construed as a limitation, and any number or combination of the described method operations can be performed in any order to perform a method, or an alternate method.

At 602, ambient lighting conditions of an environment are determined with a camera device. For example, the image exposure module 130 implemented by the camera device 100 determines the ambient lighting conditions 132 of the environment 204 for image capture of the subject 202 in the environment. Generally, the ambient lighting is the light already present in an environment before any additional lighting is added to enhance the illumination of a subject to be photographed, and the ambient light of an environment may be provided by natural light and/or artificial lights.

At 604, optimal lighting for image capture of a subject in the environment is determined. For example, the image exposure module 130 of the camera device 100 determines the optimal lighting 136 (or approximate optimal lighting) for the image capture of the subject 202 in the environment 204 as the digital photos 120. The optimal lighting 136 can be determined from the preview images 118 that are generated with the imager 116 of the camera 108 prior to the final image capture of the subject 202 being photographed in the environment 204.

At 606, natural lighting shades that are operable to allow or block natural light entering the environment are discovered. For example, the image exposure module 130 of the camera device 100 discovers the natural lighting shades 214 that are operable to allow or block natural light entering the environment 204. The natural lighting shades 214 include conventionally thought of window shades that raise and lower to block or allow natural light to enter a room, but may also include electronic window adjustments that can be turned-on or turned-off to block or allow the natural light to enter the room, as well as any other type of shade device, window cover, skylight cover or control, and the like.

At 608, one or more of the natural lighting shades are controlled and used to adjust the ambient lighting conditions for the optimal lighting and the image capture of the subject. For example, the image exposure module 130 of the camera device 100 controls the natural lighting shades 214 in the environment 204, including opening a natural lighting shade to allow the natural light entering the environment or closing the natural lighting shade to block the natural light from entering the environment. The image exposure module 130 wirelessly communicates with a controller or controllers of the natural lighting shades to discover the lighting shades and to control the natural lighting shades.

At 610, exposure settings of the camera device are adjusted to coincide with the determined optimal lighting for the image capture of the subject in the environment. For example, the image exposure module 130 of the camera device 100 adjusts the exposure settings 138 of the camera device to coincide with the determined optimal lighting 136 for the image capture of the subject 202 in the environment 204.

At 612, an image of the subject in the environment is captured with the camera device at the controlled lighting level based on the ambient lighting conditions adjusted with the one or more natural lighting shades allowing the natural light entering the environment or blocking the natural light from entering the environment. For example, the imager of the camera 108 in the camera device 100 captures the digital photos 120 of the subject 202 in the environment 204 using the natural lighting shades 214 to control the amount of natural light in the environment 204.

At 614, the image is adjusted after image capture by image processing utilizing determined environment lighting parameters. For example, the image exposure module 130 implemented in the camera device 100 adjusts and/or corrects a captured digital photo 120 by image processing utilizing the determined and/or stored lighting information, such as the lighting capabilities 146 and other image metadata 122, information, and/or parameters about the fixed light sources 144. The image processing of a captured digital photo 120 by the image exposure module 130 can be based on the lighting parameters, including the spectral capabilities of the fixed light sources 144, exposure control, color correction matrices, noise reduction in the images, tone mapping, and the like.

Figure 7:
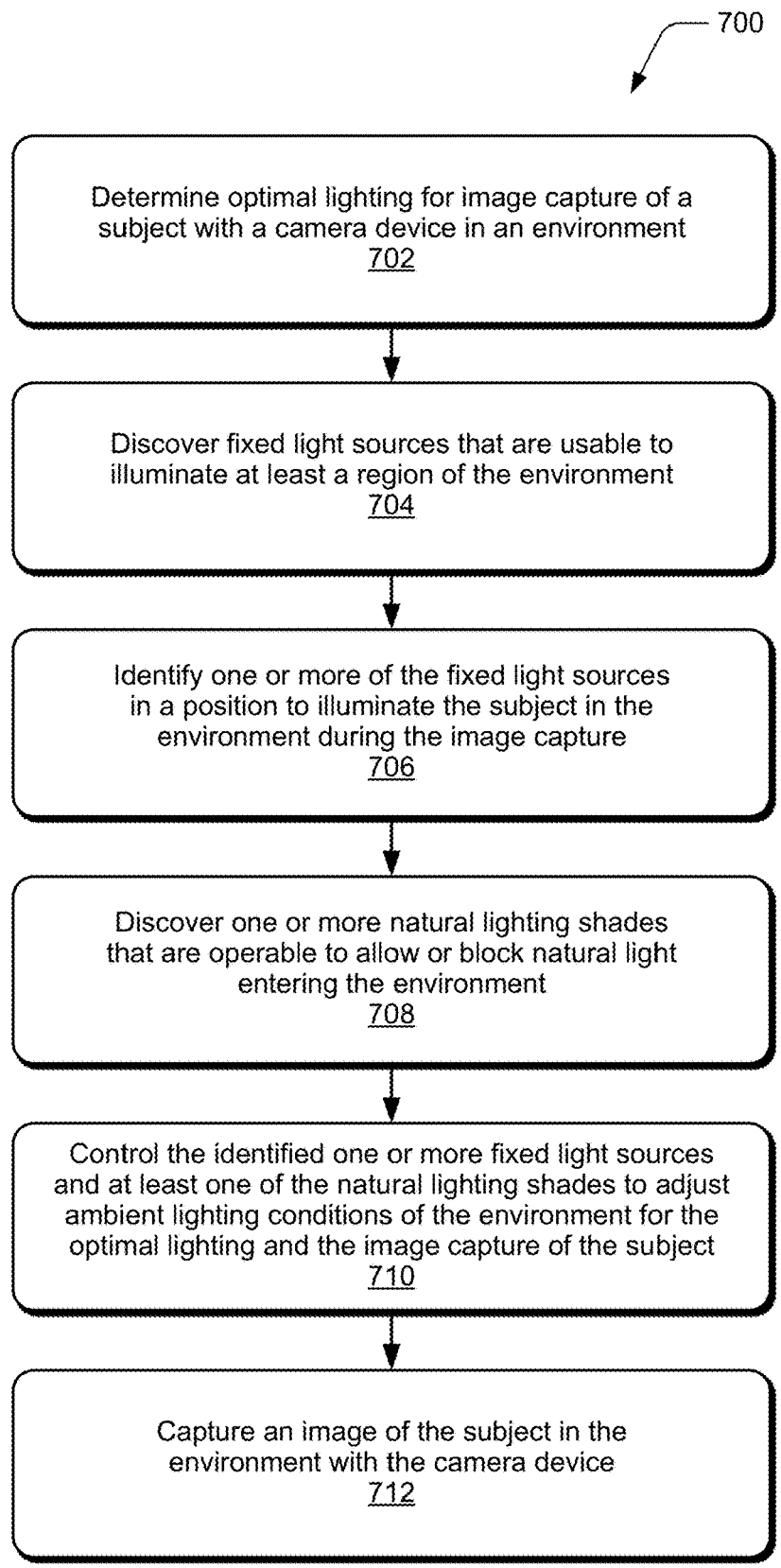
FIG. 7 illustrates an example method of photography lighting control in accordance with one or more implementations of the techniques described herein.

FIG. 7 illustrates an example method 700 of photography lighting control, and the method is generally described with reference to the image exposure module implemented in a camera device. The order in which the method is described is not intended to be construed as a limitation, and any number or combination of the described method operations can be performed in any order to perform a method, or an alternate method.

At 702, optimal lighting is determined for image capture of a subject with a camera device in an environment. For example, the image exposure module 130 of the camera device 100 determines the optimal lighting 136 (or approximate optimal lighting) for the image capture of the subject 202 in the environment 204 as the digital photos 120. The optimal lighting 136 can be determined from the preview images 118 that are generated with the imager 116 of the camera 108 prior to the final image capture of the subject 202 being photographed in the environment 204.

At 704, fixed light sources that are usable to illuminate at least a region of the environment are discovered. For example, the image exposure module 130 of the camera device 100 discovers the fixed light sources 144 that are usable to illuminate the subject 202 for image capture in the environment 204, such as the several canned ceiling lights 208 and the two hanging light fixtures 210, 212 in the smart home ecosystem 206 of the environment 204.

At 706, one or more of the fixed light sources in a position to illuminate the subject in the environment during the image capture are identified. For example, the image exposure module 130 of the camera device 100 identifies that the light 216 from the various canned ceiling lights 208, as well as the light 218 from the hanging light fixture 210, will illuminate the subject 202 in the environment 204 based on the location of the subject 202 relative to the position of the identified lights.

At 708, one or more natural lighting shades that are operable to allow or block natural light entering the environment are discovered. For example, the image exposure module 130 of the camera device 100 discovers the natural lighting shades 214 that are operable to allow or block natural light entering the environment 204. The natural lighting shades 214 include conventionally thought of window shades that raise and lower to block or allow natural light to enter a room, but may also include electronic window adjustments that can be turned-on or turned-off to block or allow the natural light to enter the room, as well as any other type of shade device, window cover, skylight cover or control, and the like.

At 710, the identified one or more fixed light sources and at least one of the natural lighting shades are controlled to adjust ambient lighting conditions of the environment for the optimal lighting and the image capture of the subject. For example, the image exposure module 130 of the camera device 100 controls the natural lighting shades 214 in the environment 204, including opening a natural lighting shade to allow the natural light entering the environment or closing the natural lighting shade to block the natural light from entering the environment. The image exposure module 130 wirelessly communicates with a controller or controllers of the natural lighting shades 214 to discover the lighting shades and control the natural lighting shades.

At 712, an image of the subject in the environment is captured with the camera device. For example, the imager of the camera 108 in the camera device 100 captures the digital photos 120 of the subject 202 in the environment 204 using the natural lighting shades 214 to control the amount of natural light in the environment 204 and using the fixed light sources 144 and/or the flash device 124 for the image capture of the subject 202.

Figure 8:
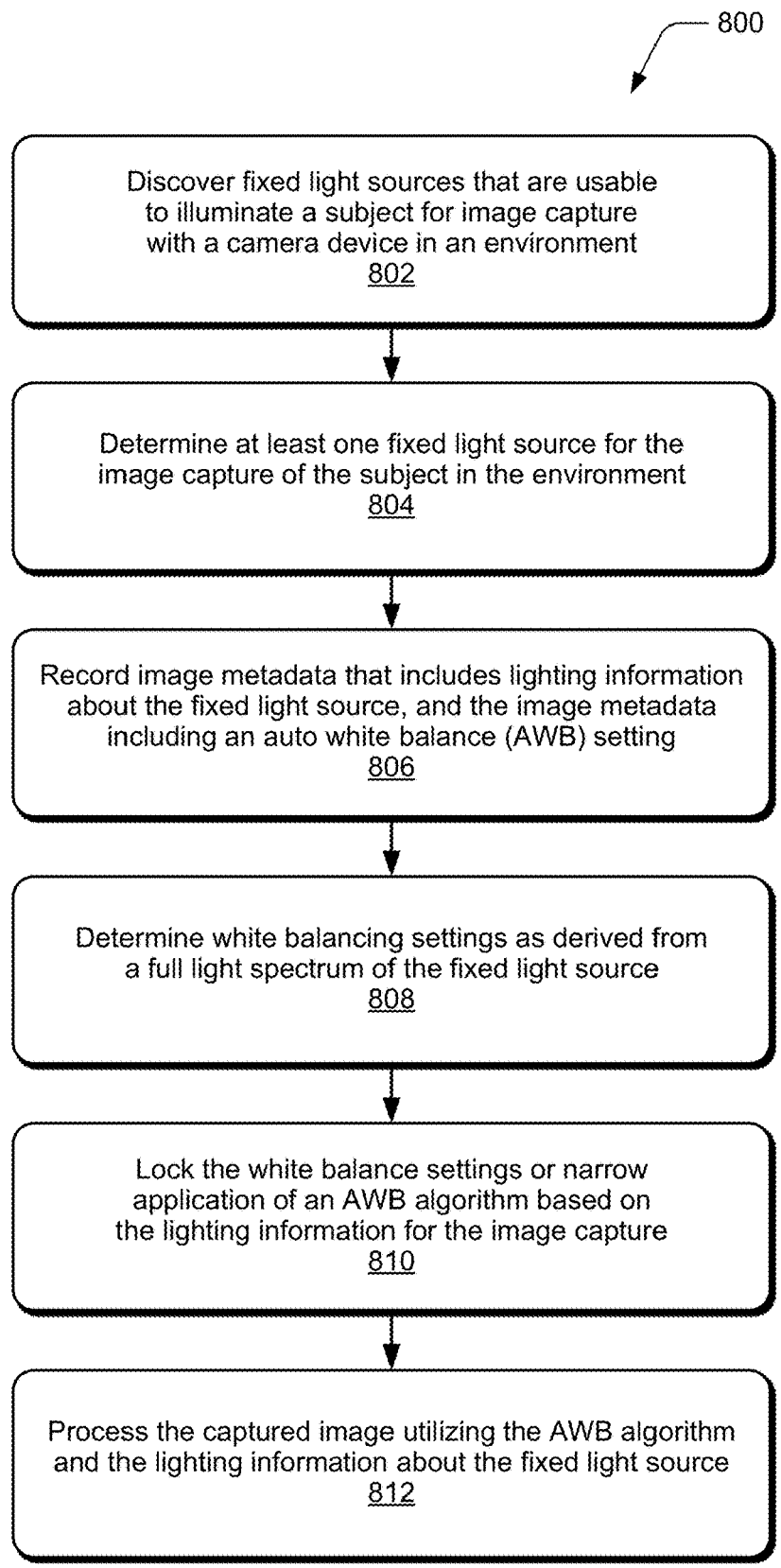
FIG. 8 illustrates an example method of photography lighting control in accordance with one or more implementations of the techniques described herein.

FIG. 8 illustrates an example method 800 of photography lighting control, and the method is generally described with reference to the image exposure module implemented in a camera device. The order in which the method is described is not intended to be construed as a limitation, and any number or combination of the described method operations can be performed in any order to perform a method, or an alternate method.

At 802, fixed light sources are discovered, the fixed light sources being usable to illuminate a subject for image capture with a camera device in an environment. For example, the image exposure module 130 of the camera device 100 discovers the fixed light sources 144 that are usable to illuminate the subject 202 for image capture in the environment 204, such as the several canned ceiling lights 208 and the two hanging light fixtures 210, 212 in the smart home ecosystem 206 of the environment 204.

At 804, at least one fixed light source is determined for the image capture of the subject in the environment. For example, the image exposure module 130 of the camera device 100 determines at least one of the fixed light sources 144 that can be used to illuminate the subject 202 in the environment 204 for the image capture. In a passive sense, the canned ceiling lights 208 may already be turned-on, providing illumination of the subject 202 in the environment 204, and the image exposure module 130 of the camera device 100 does not need to initiate further communication with a controller or controllers of the fixed light sources 144 to turn-on or otherwise control the ceiling lights. In this instance, the image capture of the subject 202 in the environment 204 can occur with the existing illumination provided by the canned ceiling lights 208.

At 806, image metadata is recorded that includes lighting information about the fixed light sources, and the image metadata including an auto white balance (AWB) setting. For example, the image exposure module 130 of the camera device 100 can initiate recording the image metadata 122 that is associated with one or more of the digital photos 120. The image metadata 122 can be maintained in the device memory 112, and includes lighting information about the fixed light sources 144, as well as an auto white balance (AWB) setting or settings for the one or more digital photos. For example, the image metadata 122 includes lighting information about a fixed light source (e.g., the canned ceiling lights 208) that is used to illuminate the subject 202 in the environment 204. The lighting information can include a type of the fixed light source, such as whether the light is an incandescent, fluorescent, LED, or other type of light source. The lighting information can also include an indication of the brightness of the fixed light source, and a color temperature of the fixed light source, as well as a full light spectrum of the fixed light source.

At 808, white balancing settings are determined as derived from a full light spectrum of the fixed light source. For example, the AWB algorithm 140 of the image exposure module 130 determines the white balance settings for a digital photo 120 as derived from the full light spectrum for the fixed light source, as maintained in the image metadata 122 as the lighting information that corresponds to the fixed light source. For instance, the white balancing x,y coordinates for an image can be derived from the full light spectrum that corresponds to the fixed light source. Generally, a transfer matrix can be utilized by the AWB algorithm 140 to transform RGB color space image data to x,y,z chromatic coordinates.

At 810, the white balance settings are locked, or application of an AWB algorithm is narrowed based on the lighting information for the image capture. For example, the AWB algorithm 140 of the image exposure module 130 can initiate to lock the white balance settings and/or narrow application of the AWB algorithm based on the lighting information for the image capture. At 812, the captured image is processed utilizing the AWB algorithm and the lighting information about the fixed light source. For example, the image exposure module 130 can process the image of a captured digital photo 120 utilizing the AWB settings with the AWB algorithm, and based on the lighting information that corresponds to the fixed light source used to illuminate the subject 202 in the environment 204 for the image capture.

Figure 9:
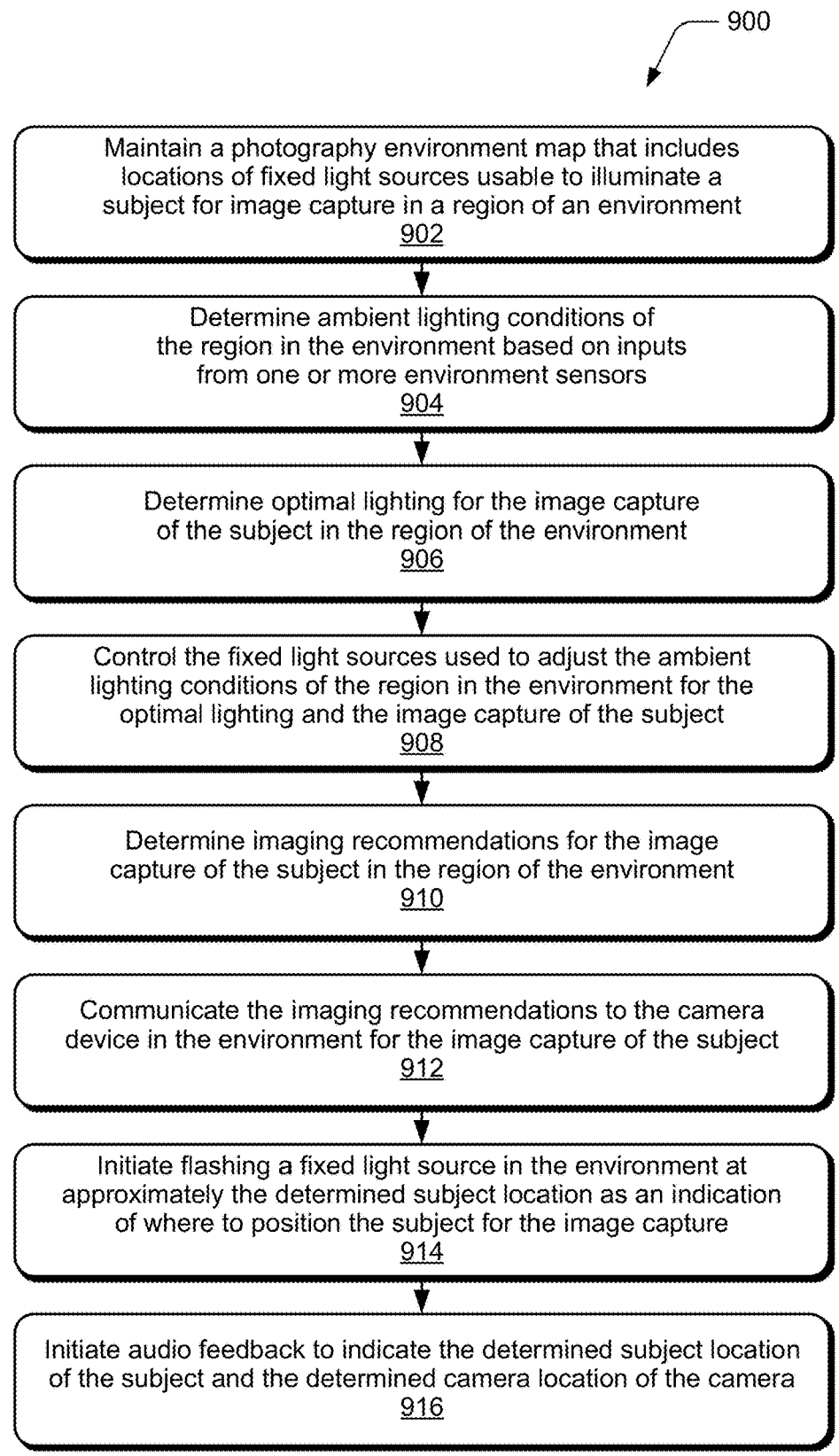
FIG. 9 illustrates an example method of photography environment control in accordance with one or more implementations of the techniques described herein.

FIG. 9 illustrates an example method 900 of photography environment control, and the method is generally described with reference to the imaging recommendation module implemented in the environment controller. The order in which the method is described is not intended to be construed as a limitation, and any number or combination of the described method operations can be performed in any order to perform a method, or an alternate method.

At 902, a photography environment map is maintained and includes locations of fixed light sources usable to illuminate a subject for image capture in a region of an environment. For example, the imaging recommendation module 316 develops and maintains the photography environment map 320 of the environment 204, and the photography environment map 320 is stored in the device memory 304. The photography environment map 320 includes the locations of the natural lighting shades 142 in the environment 204, as well as the locations of the fixed light sources 144 that are usable to illuminate the subject 202 for image capture in a region of the environment.

At 904, ambient lighting conditions of the region in the environment are determined based on inputs from one or more environment sensors. For example, the imaging recommendation module 316 determines the lighting conditions 322 (e.g., the ambient lighting conditions 132) of a region in the environment 204 based on inputs from the environment sensors 312, such as light detection sensors. The imaging recommendation module 316 may also receive lighting condition inputs from the camera device 100 that utilizes the light detection sensors 134 of the device, and the imaging recommendation module 316 determines the ambient lighting conditions 322 of a region in the environment based on the lighting condition inputs from the camera device.

At 906, optimal lighting is determined for the image capture of the subject in the region of the environment. For example, the imaging recommendation module 316 determines the optimal lighting 324 for the image capture of the subject 202 in a region of the environment 204. The imaging recommendation module 316 may also receive the captured images 326 (e.g., digital photos 120) from the digital camera 102 and determine the optimal lighting 324 for a particular region of the environment from the captured images. Further, the imaging recommendation module 316 can be implemented to utilize any combination of the environment sensors 312, lighting condition inputs from the digital camera 102, and/or the captured images 326 to determine the lighting conditions 322 and the optimal lighting 324 for a region of the environment.

At 908, the fixed light sources used to adjust the ambient lighting conditions of the region in the environment are controlled for the optimal lighting and the image capture of the subject. For example, the imaging recommendation module 316 controls the natural lighting shades 142 and/or the fixed light sources 144 to adjust the ambient lighting conditions 322 of the region in the environment 204 for the optimal lighting 324 and the image capture of the subject. The environment controller 300 includes a communication interface 306 for wireless communication with a controller or controllers of the fixed light sources 144, and the environment controller 300 utilizes wireless communication to control the fixed light sources, including to turn a fixed light source on or turn the fixed light source off to achieve the optimal lighting.

At 910, imaging recommendations are determined for the image capture of the subject in the region of the environment. For example, the imaging recommendation module 316 determines the various imaging recommendations 328, such as the exposure settings 330 of the camera device 100 that coincide with the determined optimal lighting 324 for the image capture of the subject 202 in the region of the environment 204. The imaging recommendation module 316 also determines the subject location 332 of where to position the subject 202 for the image capture in the region of the environment, and the subject location 332 may be determined to coincide with the determined optimal lighting 324 in the region of the environment. The imaging recommendation module 316 also determines the camera location 334 of where to position the camera device 100 for the image capture in the region of the environment, and the camera location 334 may be determined to coincide with the determined optimal lighting 324 in the region of the environment. The imaging recommendation module 316 also determines a preferred image backdrop 340 in the environment based on the historical imaging data 338.

At 912, the imaging recommendations are communicated to the camera device in the environment for the image capture of the subject. For example, the imaging recommendation module 316 initiates communication of the imaging recommendations 328 from the environment controller 300 to the camera device 100, and the imaging recommendations are displayable on the display screen 152 of the camera device. As shown in the example at 402, the imaging recommendation of the subject location 332 is displayable on the display screen 152 of the camera device 100, and includes a displayable indication 404 of where to position the subject in the environment for the image capture. As shown in the example at 406, the imaging recommendation of the camera location 334 is displayable on the display screen 152 of the camera device 100, and includes a displayable indication 408 of where to position the camera in the environment for the image capture. As shown in the example at 412, the imaging recommendation of the preferred image backdrop 340 is displayable on the display screen 152 of the camera device 100 as a photo opportunity recommendation in the environment for the image capture.

At 914, a fixed light source is flashed in the environment at approximately the determined subject location as an indication of where to position the subject for the image capture. For example, the imaging recommendation module 316 initiates flashing one of the fixed light sources 144 in the environment 204 at approximately the determined subject location 332 as an indication of where to position the subject for the image capture. In the example shown in FIG. 2, the imaging recommendation module 316 of the environment controller 300 controls one of the canned ceiling lights 208 above the subject 202, causing the canned ceiling light 208 to flash as an indication of where the person should stand in the room for the photograph.

At 916, audio feedback is initiated to indicate the determined subject location of the subject and the determined camera location of the camera. For example, the imaging recommendation module 316 initiates audio feedback via the audio interface 336 of the environment controller 300 to provide positioning instructions that indicate the determined subject location 332 of the subject 202 and/or the determined camera location 334 of the camera device 100 in the environment.

Figure 10:
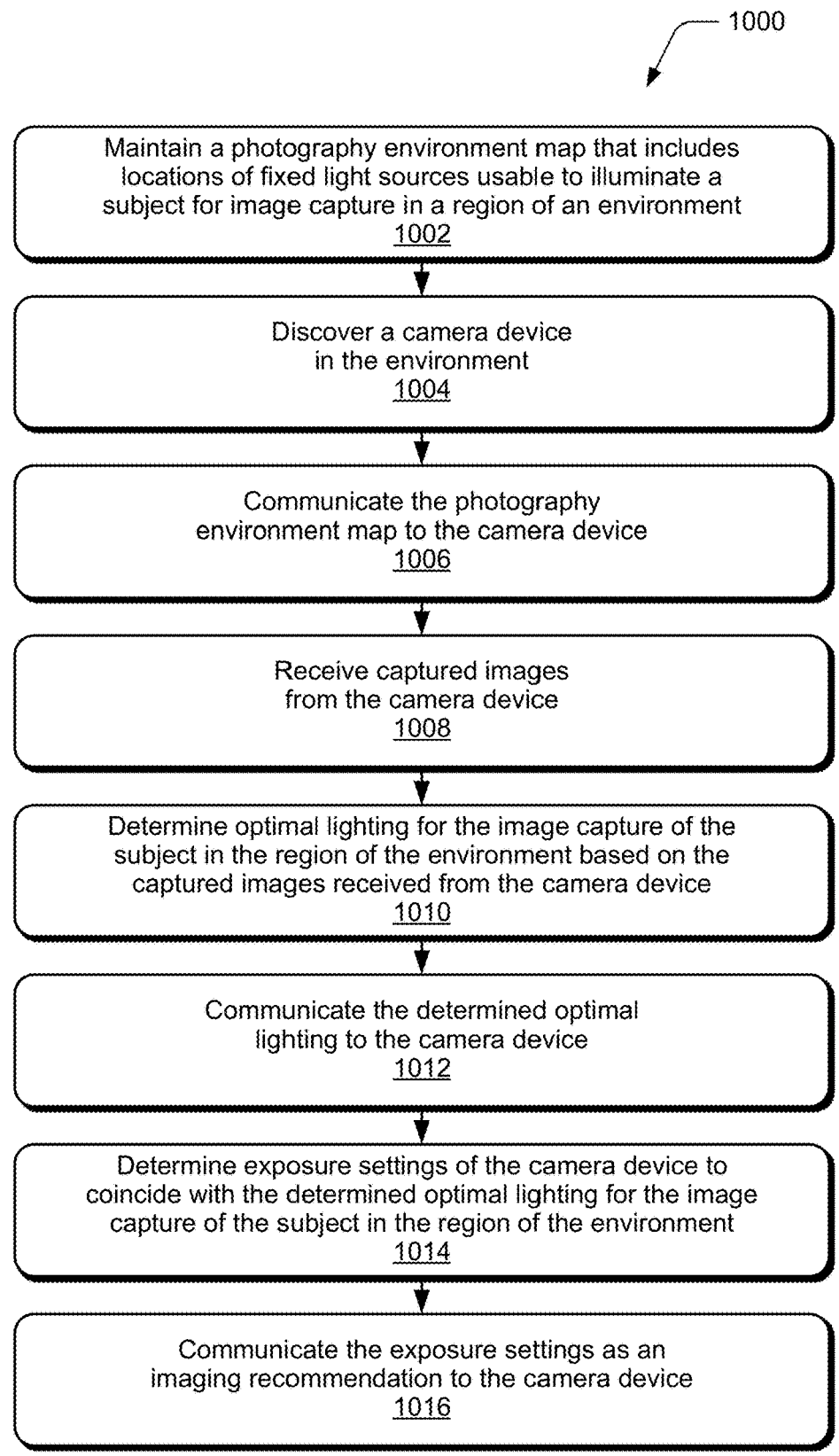
FIG. 10 illustrates an example method of photography environment control in accordance with one or more implementations of the techniques described herein.

FIG. 10 illustrates an example method 1000 of photography environment control, and the method is generally described with reference to the imaging recommendation module implemented in the environment controller. The order in which the method is described is not intended to be construed as a limitation, and any number or combination of the described method operations can be performed in any order to perform a method, or an alternate method.

At 1002, a photography environment map is maintained and includes locations of fixed light sources usable to illuminate a subject for image capture in a region of an environment. For example, the imaging recommendation module 316 develops and maintains the photography environment map 320 of the environment 204, and the photography environment map 320 is stored in the device memory 304. The photography environment map 320 includes the locations of the natural lighting shades 142 in the environment 204, as well as the locations of the fixed light sources 144 that are usable to illuminate the subject 202 for image capture in a region of the environment.

At 1004, a camera device is discovered in the environment. For example, the environment controller 300 discovers when the camera device 100 enters into the photographic environment 204, and communicates with the camera device, such as via the router device 228. The environment controller 300 can be implemented with any one of several device discovery utilities to detect a device configured for wireless communication, such as the camera device 100 when a user carries the camera into the ecosystem 206 of connected devices in a home automation wireless communication environment.

At 1006, the photography environment map is communicated to the camera device. For example, the imaging recommendation module 316 initiates communication of the photography environment map 320 to the camera device 100 that utilizes the photography environment map 320 to determine the fixed light sources 144 and/or the natural lighting shades 142 that are usable to optimize the lighting conditions for the image capture of the subject 202 in the region of the environment.

At 1008, captured images are received from the camera device, and at 1010, optimal lighting is determined for the image capture of the subject in the region of the environment based on the captured images received from the camera device. For example, the imaging recommendation module 316 implemented in the environment controller 300 receives the captured images 326 (e.g., digital photos 120) from the camera device 100 and determines the optimal lighting 324 for a particular region of the environment from the captured images. At 1012, the determined optimal lighting is communicated to the camera device. For example, the imaging recommendation module 316 initiates communication of the determined optimal lighting 324 from the environment controller 300 to the camera device 100.

At 1014, exposure settings of the camera device are determined to coincide with the determined optimal lighting for the image capture of the subject in the region of the environment. For example, the imaging recommendation module 316 determines, as an imaging recommendation 328, the exposure settings 330 of the camera device 100 that coincide with the determined optimal lighting 324 for the image capture of the subject 202 in the region of the environment 204. At 1016, the exposure settings are communicated as an imaging recommendation to the camera device. For example the imaging recommendation module 316 initiates communication of the exposure settings 330 as an imaging recommendation 328 from the environment controller 300 to the camera device 100.

Figure 11:
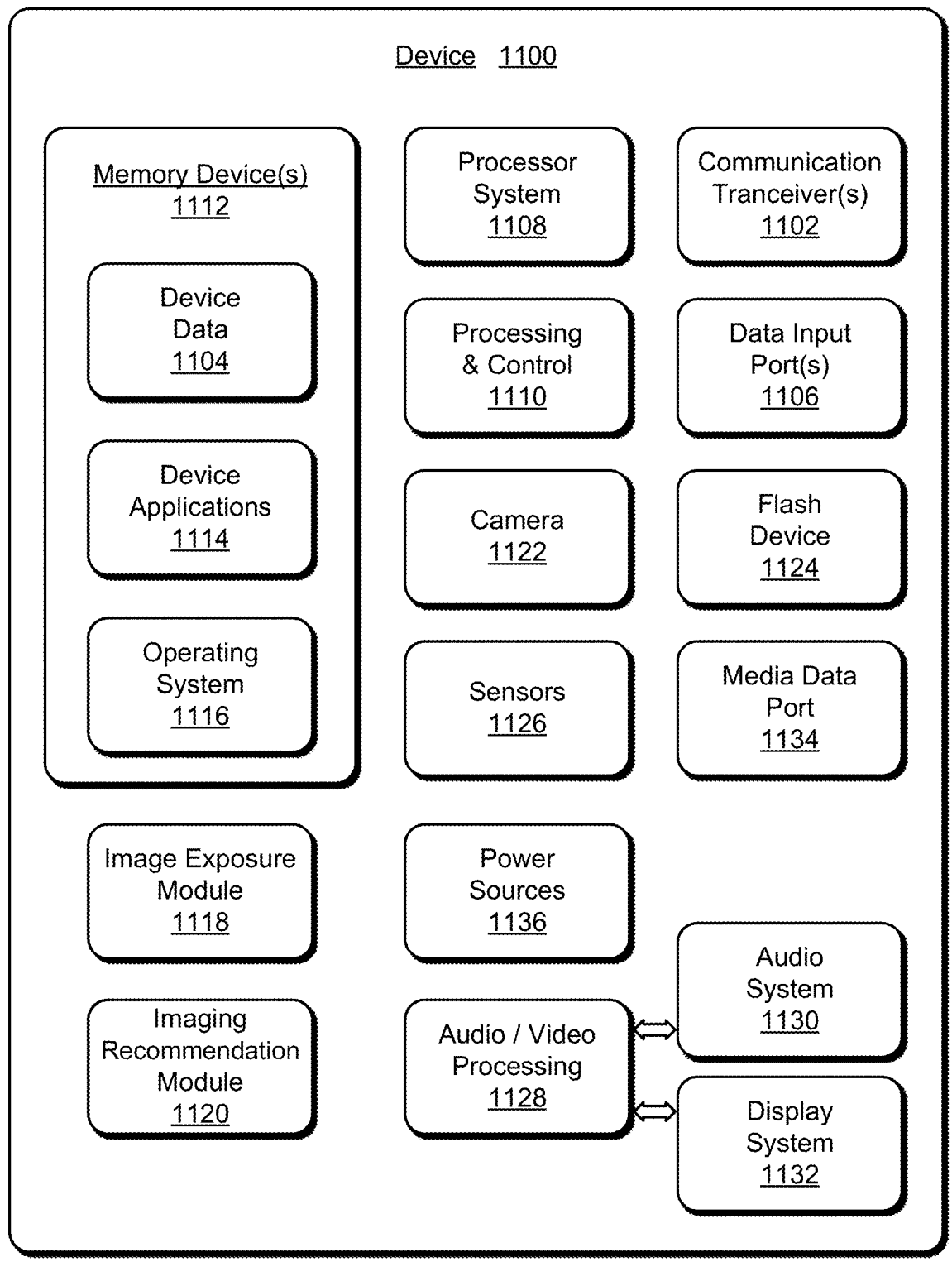
FIG. 11 illustrates various components of an example device that can implement aspects of photography lighting control.

FIG. 11 illustrates various components of an example device 1100, which can implement examples of photography lighting control and/or examples of photography environment control. The example device 1100 can be implemented as any type of camera device, as a mobile device that includes an integrated camera device, as an environment controller device, as a smart home controller, and in any form of an electronic and/or computing device. For example, the camera device 100 and/or the environment controller 300 shown and described with reference to FIGS. 1-10 may be implemented as the example device 1100.

The device 1100 includes communication transceivers 1102 that enable wired and/or wireless communication of device data 1104 with other devices. The device data 1104 can include any of the camera preview images, digital photos, and image metadata, as well as the discovered and/or controlled devices, and any of the image exposure settings and environment conditions that are detected and/or determined. The device data can also include any of the photography environment mapping, imaging data, and recommendations, such as subject location, camera location, and image backdrop. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1100 may also include one or more data input ports 1106 via which any type of data, media content, and/or inputs can be received, such as user-selectable inputs to the device, messages, music, television content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1100 includes a processing system 1108 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1110. The device 1100 may further include any type of a system bus or other data and command transfer system that couples the various components within the device. A system bus can include any one or combination of different bus structures and architectures, as well as control and data lines.

The device 1100 also includes computer-readable storage memory 1112 that enables data storage, such as data storage devices that can be accessed by a computing device, and that provide persistent storage of data and executable instructions (e.g., software applications, programs, algorithms, functions, and the like). Examples of the computer-readable storage memory 1112 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory devices in various memory device configurations. The device 1100 may also include a mass storage media device.

The computer-readable storage memory 1112 provides data storage mechanisms to store the device data 1104, other types of information and/or data, and various device applications 1114 (e.g., software applications). For example, an operating system 1116 can be maintained as software instructions with a memory device and executed by the processor system 1108. The device applications may also include a device manager, such as any form of a control application, software application, signal-processing and control module, code that is native to a particular device, a hardware abstraction layer for a particular device, and so on.

In this example, the device 1100 includes an image exposure module 1118 that implements features and aspects of photography lighting control, and may be implemented with hardware components and/or in software, such as when the device 1100 is implemented as the camera device 100 described with reference to FIGS. 1, 2, and 5-8. An example of the image exposure module 1118 is the image exposure module 130 implemented as a software application and/or as hardware components in the camera device 100 as described and shown in the previous figures. In implementations, the image exposure module 1118 may include independent processing, memory, and logic components as a computing and/or electronic device integrated with the example device 1100.

The device 1100 also includes an imaging recommendation module 1120 that implements features and aspects of photography environment control, and may be implemented with hardware components and/or in software, such as when the device 1100 is implemented as the environment controller 300 described with reference to FIGS. 3, 4, 9, and 10. An example of the imaging recommendation module 1120 is the imaging recommendation module 316 implemented as a software application and/or as hardware components in the environment controller 300 as described and shown in the previous figures. In implementations, the imaging recommendation module 1120 may include independent processing, memory, and logic components as a computing and/or electronic device integrated with the example device 1100.

In this example, the device 1100 also includes a camera 1122, a flash device 1124, and sensors 1126 (e.g., a depth sensor and/or light detection sensors), such as when the camera device 100 is implemented as the example device 1100. Examples of these components include the camera 108, the flash device 124, the light detection sensors 134, and the depth sensor 150 of the camera device 100 as shown and/or described with reference to FIGS. 1, 2, and 5-8. Further, although the flash device 1124 is shown as an integrated component of the device 1100, the flash device 1124 may be implemented as an external, peripheral component of the example device.

The device 1100 also includes an audio and/or video processing system 1128 that generates audio data for an audio system 1130 and/or generates display data for a display system 1132. An example of the display system 1132 is the display screen 152 of the camera device 100. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1134. In implementations, the audio system and/or the display system are integrated components of the example device. Alternatively, the audio system and/or the display system are external, peripheral components to the example device.

The device 1100 can also include one or more power sources 1136, such as when the device is implemented as a mobile device or portable camera device. The power sources may include a charging and/or power system, and can be implemented as a flexible strip battery, a rechargeable battery, a charged super-capacitor, and/or any other type of active or passive power source.

Although implementations of photography environment control have been described in language specific to features and/or methods, the subject of the appended claims is not necessarily limited to the specific features or methods described. Rather, the specific features and methods are disclosed as example implementations of photography environment control, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

An environment controller, comprising: a memory to maintain a photography environment map of an environment in which images are captured as photographs, the photography environment map including locations of fixed light sources that are usable to illuminate a subject for image capture in a region of the environment; an imaging recommendation module implemented to: determine optimal lighting for the image capture of the subject in the region of the environment; control one or more of the fixed light sources used to adjust ambient lighting conditions of the region in the environment for the optimal lighting and the image capture of the subject; and initiate communication of one or more imaging recommendations to a camera device in the environment for the image capture of the subject.

Alternatively or in addition to the above described environment controller, any one or combination of: the imaging recommendation module is implemented to determine the ambient lighting conditions of the region in the environment based on inputs from one or more environment sensors. The imaging recommendation module is implemented to receive lighting condition inputs from the camera device that utilizes one or more light detection sensors; and determine the ambient lighting conditions of the region in the environment based on the lighting condition inputs from the camera device. Further comprising a communication interface for wireless communication with a controller of at least one of the fixed light sources; and wherein the imaging recommendation module utilizes the wireless communication to initiate control of the fixed light source, including to turn the fixed light source on or turn the fixed light source off to achieve the optimal lighting. The imaging recommendation module is implemented to determine exposure settings of the camera device to coincide with the determined optimal lighting for the image capture of the subject in the region of the environment; and initiate communication of the exposure settings as an imaging recommendation to the camera device. The imaging recommendation module is implemented to determine a subject location of where to position the subject for the image capture in the region of the environment; and initiate communication of the subject location as an imaging recommendation to the camera device. The imaging recommendation module is implemented to determine a subject location of where to position the subject for the image capture in the region of the environment; and initiate flashing a fixed light source in the environment at approximately the determined subject location as an indication of where to position the subject for the image capture. The imaging recommendation module is implemented to determine a camera location of where to position the camera device for the image capture in the region of the environment; and initiate communication of the camera location as an imaging recommendation to the camera device. The imaging recommendation module is implemented to initiate communication of the region of the environment as a photo opportunity recommendation to the camera device. The imaging recommendation module is implemented to determine a subject location of where to position the subject and a camera location of where to position the camera device for the image capture of the subject in the region of the environment, the subject location and the camera location determined to coincide with the determined optimal lighting in the region of the environment; and initiate communication of the subject location and the camera location as the one or more imaging recommendations to the camera device, the one or more imaging recommendations displayable on a display screen of the camera device. The imaging recommendation module is implemented to: determine a subject location of where to position the subject and a camera location of where to position the camera device for the image capture of the subject in the region of the environment; and initiate audio feedback to indicate the determined subject location of the subject and the determined camera location of the camera. The imaging recommendation module is implemented to develop historical imaging data corresponding to multiple image captures in the environment; determine a preferred image backdrop in the environment based on the historical imaging data; and initiate communication of the preferred image backdrop as an imaging recommendation to the camera device, the imaging recommendation including a visual image of the preferred image backdrop for display on a display screen of the camera device.

An environment controller, comprising: a memory to maintain a photography environment map of an environment in which images are captured as photographs, the photography environment map including locations of fixed light sources that are usable to illuminate a subject for image capture in a region of the environment; an imaging recommendation module implemented to: discover a camera device in the environment; and initiate communication of the photography environment map to the camera device that utilizes the photography environment map to determine one or more of the fixed light sources usable to optimize lighting conditions for the image capture of the subject in the region of the environment.

Alternatively or in addition to the above described environment controller, any one or combination of: the photography environment map further includes locations of one or more natural lighting shades that are operable to allow or block natural light entering the environment; and the camera device utilizes the photography environment map to determine one or more of the natural lighting shades usable to further optimize the lighting conditions for the image capture of the subject in the region of the environment. The imaging recommendation module is implemented to receive captured images from the camera device; determine optimal lighting for the image capture of the subject in the region of the environment based on the captured images received from the camera device; and initiate communication of the determined optimal lighting to the camera device. The imaging recommendation module is implemented to determine exposure settings of the camera device to coincide with the determined optimal lighting for the image capture of the subject in the region of the environment; and initiate communication of the exposure settings as an imaging recommendation to the camera device.

A method, comprising: maintaining a photography environment map that includes locations of fixed light sources usable to illuminate a subject for image capture in a region of an environment; discovering a camera device in the environment; determining optimal lighting for the image capture of the subject in the region of the environment; controlling one or more of the fixed light sources used to adjust ambient lighting conditions of the region in the environment for the optimal lighting and the image capture of the subject; and communicating one or more imaging recommendations to the camera device in the environment for the image capture of the subject.

Alternatively or in addition to the above described method, any one or combination of: further comprising receiving captured images from the camera device; and said determining the optimal lighting for the image capture of the subject in the region of the environment based on the captured images received from the camera device. Further comprising determining exposure settings of the camera device to coincide with the determined optimal lighting for the image capture of the subject in the region of the environment; and communicating the exposure settings as an imaging recommendation to the camera device. Further comprising determining a subject location of where to position the subject for the image capture in the region of the environment; and communicating the subject location as an imaging recommendation to the camera device. Further comprising determining a subject location of where to position the subject for the image capture in the region of the environment; and flashing a fixed light source in the environment at approximately the determined subject location as an indication of where to position the subject for the image capture. Further comprising determining a camera location of where to position the camera device for the image capture in the region of the environment; and communicating the camera location as an imaging recommendation to the camera device. Further comprising determining a subject location of where to position the subject and a camera location of where to position the camera device for the image capture of the subject in the region of the environment; and initiating audio feedback to indicate the determined subject location of the subject and the determined camera location of the camera. Further comprising developing historical imaging data corresponding to multiple image captures in the environment; determining a photo opportunity recommendation based on the historical imaging data; and communicating the photo opportunity recommendation to the camera device, the photo opportunity recommendation including a visual image of an image backdrop for display on a display screen of the camera device.

The invention claimed is:

1. An environment controller, comprising:
   a memory to maintain a photography environment map of an environment in which images are captured as photographs, the photography environment map including locations of fixed light sources that are usable to illuminate a subject for image capture in a region of the environment;
   an imaging recommendation module implemented by a processor programmed to:
      receive inputs of ambient lighting conditions in the region of the environment from one or more light detection sensors that detect lighting of the environment;
      determine optimal lighting for the image capture of the subject in the region of the environment based at least in part on the inputs from the one or more light detection sensors;
      control one or more of the fixed light sources used to adjust the ambient lighting conditions of the region in the environment for the optimal lighting and the image capture of the subject;
      determine exposure settings of a camera device to coincide with the determined optimal lighting for the image capture of the subject in the region of the environment, the environment controller configured for communication with the camera device via a network access point that facilitates network connectivity of the environment controller and the camera device in the environment; and
      initiate communication of one or more imaging recommendations to the camera device via the network access point in the environment, the camera device being configured for the image capture of the subject using the one or more imaging recommendations, the one or more imaging recommendations including the exposure settings of the camera device.

2. The environment controller as recited in claim 1, wherein the one or more light detection sensors that detect the ambient lighting conditions in the region of the environment include at least one of a security camera or the camera device.

3. The environment controller as recited in claim 1, wherein the imaging recommendation module is implemented to:
   receive lighting condition inputs from the camera device that utilizes the one or more light detection sensors; and
   determine the ambient lighting conditions of the region in the environment based on the lighting condition inputs from the camera device.

4. The environment controller as recited in claim 1, further comprising:
   a communication interface for wireless communication with a controller of at least one of the fixed light sources; and
   wherein the imaging recommendation module utilizes the wireless communication to initiate control of the fixed light source, including to turn the fixed light source on or turn the fixed light source off to achieve the optimal lighting.

5. The environment controller as recited in claim 1, wherein the imaging recommendation module is implemented to:
   determine a subject location of where to position the subject for the image capture in the region of the environment; and
   initiate communication of the subject location as an imaging recommendation to the camera device.

6. The environment controller as recited in claim 1, wherein the imaging recommendation module is implemented to:
   determine a subject location of where to position the subject for the image capture in the region of the environment; and
   initiate flashing a fixed light source in the environment at approximately the determined subject location as an indication of where to position the subject for the image capture.

7. The environment controller as recited in claim 1, wherein the imaging recommendation module is implemented to:
   determine a camera location of where to position the camera device for the image capture in the region of the environment; and
   initiate communication of the camera location as an imaging recommendation to the camera device.

8. The environment controller as recited in claim 1, wherein the imaging recommendation module is implemented to initiate communication of the region of the environment as a photo opportunity recommendation to the camera device.

9. The environment controller as recited in claim 1, wherein the imaging recommendation module is implemented to:
   determine a subject location of where to position the subject and a camera location of where to position the camera device for the image capture of the subject in the region of the environment, the subject location and the camera location determined to coincide with the determined optimal lighting in the region of the environment; and
   initiate communication of the subject location and the camera location as the one or more imaging recommendations to the camera device, the one or more imaging recommendations displayable on a display screen of the camera device.

10. The environment controller as recited in claim 1, wherein the imaging recommendation module is implemented to:
    determine a subject location of where to position the subject and a camera location of where to position the camera device for the image capture of the subject in the region of the environment; and
    initiate audio feedback to indicate the determined subject location of the subject and the determined camera location of the camera.

11. The environment controller as recited in claim 1, wherein the imaging recommendation module is implemented to:
    develop historical imaging data corresponding to multiple image captures in the environment;
    determine a preferred image backdrop in the environment based on the historical imaging data; and
    initiate communication of the preferred image backdrop as an imaging recommendation to the camera device, the imaging recommendation including a visual image of the preferred image backdrop for display on a display screen of the camera device.

12. A method, comprising:

maintaining, in a memory of an environment controller, a photography environment map of an environment in which images are captured as photographs, the photography environment map including locations of fixed light sources that are usable to illuminate a subject for image capture in a region of the environment;

executing an imaging recommendation module of the environment controller on a processor of a computing device performing:

receiving inputs of ambient lighting conditions in the region of the environment from one or more light detection sensors that detect lighting of the environment;

determining optimal lighting for the image capture of the subject in the region of the environment based at least in part on the inputs from the one or more light detection sensors;

controlling one or more of the fixed light sources used to adjust the ambient lighting conditions of the region in the environment for the optimal lighting and the image capture of the subject;

determining exposure settings of a camera device to coincide with the determined optimal lighting for the image capture of the subject in the region of the environment, the environment controller configured for communication with the camera device via a network access point that facilitates network connectivity of the environment controller and the camera device in the environment; and initiating communication of one or more imaging recommendations to the camera device via the network access point in the environment, the camera device being configured for the image capture of the subject using the one or more imaging recommendations, the one or more imaging recommendations including the exposure settings of the camera device.

13. The method as recited in claim 12, wherein the one or more light detection sensors that detect the ambient lighting conditions in the region of the environment include at least one of a security camera or the camera device.

14. The method as recited in claim 12, further comprising the imaging recommendation module:

receiving lighting condition inputs from the camera device that utilizes the one or more light detection sensors; and determining the ambient lighting conditions of the region in the environment based on the lighting condition inputs from the camera device.

15. The method as recited in claim 12, further comprising the imaging recommendation module:

initiating wireless communications with a controller of at least one of the fixed light sources to control the fixed light source, including to turn the fixed light source on or turn the fixed light source off to achieve the optimal lighting.

16. The method as recited in claim 12, further comprising the imaging recommendation module:

determining a subject location of where to position the subject for the image capture in the region of the environment; and initiating communication of the subject location as an imaging recommendation to the camera device.

17. The method as recited in claim 12, further comprising the imaging recommendation module:

determining a subject location of where to position the subject for the image capture in the region of the environment; and initiating flashing a fixed light source in the environment at approximately the determined subject location as an indication of where to position the subject for the image capture.

18. The method as recited in claim 12, further comprising the imaging recommendation module:

determining a camera location of where to position the camera device for the image capture in the region of the environment; and initiating communication of the camera location as an imaging recommendation to the camera device.

19. The method as recited in claim 12, further comprising the imaging recommendation module:

initiating communication of the region of the environment as a photo opportunity recommendation to the camera device.

20. The method as recited in claim 12, further comprising the imaging recommendation module:

determining a subject location of where to position the subject and a camera location of where to position the camera device for the image capture of the subject in the region of the environment, the subject location and the camera location determined to coincide with the determined optimal lighting in the region of the environment; and initiating communication of the subject location and the camera location as the one or more imaging recommendations to the camera device, the one or more imaging recommendations displayable on a display screen of the camera device.

\* \* \* \* \*